(12) United States Patent
Choi et al.

(10) Patent No.: US 9,183,372 B2
(45) Date of Patent: Nov. 10, 2015

(54) MOBILE TERMINAL AND CONTROL METHOD THEREOF

(71) Applicants: Kwonyul Choi, Seoul (KR); Sunok Kim, Seoul (KR); Jaemin Park, Seoul (KR); Mingyu Chung, Seoul (KR)

(72) Inventors: Kwonyul Choi, Seoul (KR); Sunok Kim, Seoul (KR); Jaemin Park, Seoul (KR); Mingyu Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/051,068

(22) Filed: Oct. 10, 2013

(65) Prior Publication Data

US 2014/0130143 A1    May 8, 2014

(30) Foreign Application Priority Data

Nov. 7, 2012  (KR) ........................ 10-2012-0125480
Apr. 26, 2013  (KR) ........................ 10-2013-0046963

(51) Int. Cl.
    *G06F 15/16*     (2006.01)
    *G06F 21/35*     (2013.01)
    *H04W 12/06*     (2009.01)
    *H04L 29/06*     (2006.01)

(52) U.S. Cl.
    CPC ............ *G06F 21/35* (2013.01); *H04L 63/0853* (2013.01); *H04W 12/06* (2013.01)

(58) Field of Classification Search
    None
    See application file for complete search history.

(56) References Cited

U.S. PATENT DOCUMENTS

| | | | |
|---|---|---|---|
| 2003/0070074 A1* | 4/2003 | Geller et al. | .................. 713/168 |
| 2007/0101418 A1 | 5/2007 | Wood et al. | |
| 2012/0150748 A1* | 6/2012 | Law et al. | ........................ 705/71 |
| 2012/0260329 A1* | 10/2012 | Suffling | ............................ 726/9 |
| 2014/0156531 A1* | 6/2014 | Poon et al. | ...................... 705/44 |

FOREIGN PATENT DOCUMENTS

| | | |
|---|---|---|
| CN | 1399850 A | 2/2003 |
| WO | WO 01/17297 A1 | 3/2001 |

OTHER PUBLICATIONS

Park, Kyungwhan et al.: "Smartphone Remote Lock and Wipe System with Integrity Checking of SMS Notification"; 2011 IEEE International Conference on Consumer Electronics; Las Vegas, Nevada; Jan. 9, 2011; pp. 263-264 (XP-031921221).

European Search Report dated Jan. 31, 2014 issued in Application No. 13 00 5118.

Chinese Office Action issued in Application No. 201310525039.0 dated Mar. 9, 2015. (with English Translation).

* cited by examiner

*Primary Examiner* — Kaveh Abrishamkar
(74) *Attorney, Agent, or Firm* — KED & Associates LLP

(57) ABSTRACT

A mobile terminal for receiving a message and a control method thereof are provided. The mobile terminal includes: a wireless communication unit configured to receive at least one of authentication information and a message from an external electronic device; an authenticating unit configured to perform user authentication by using the authentication information received from the electronic device; and a controller configured to perform a control operation in response to a control command included in the received message when the user authentication is performed, and transmit a message indicating the result of performing the control operation to the electronic device.

19 Claims, 18 Drawing Sheets

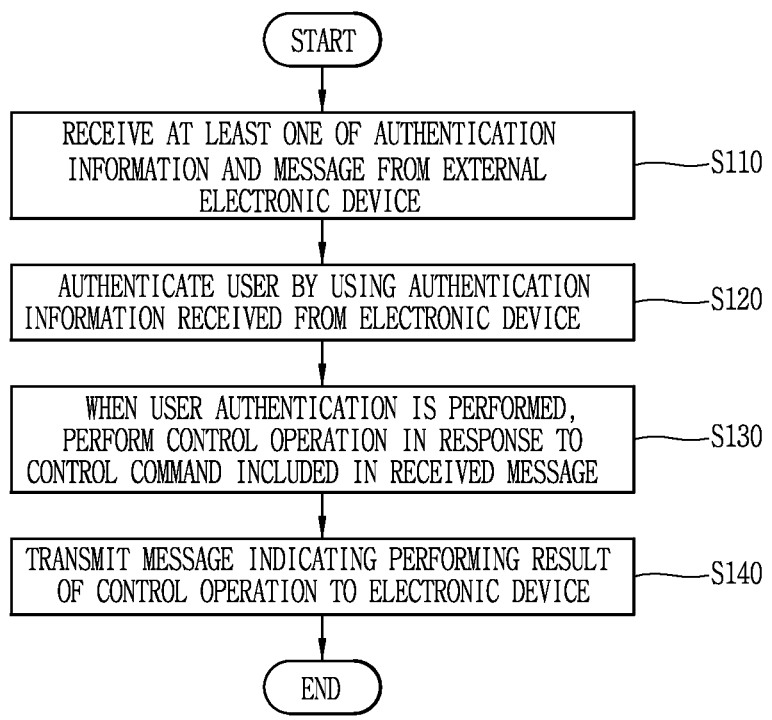

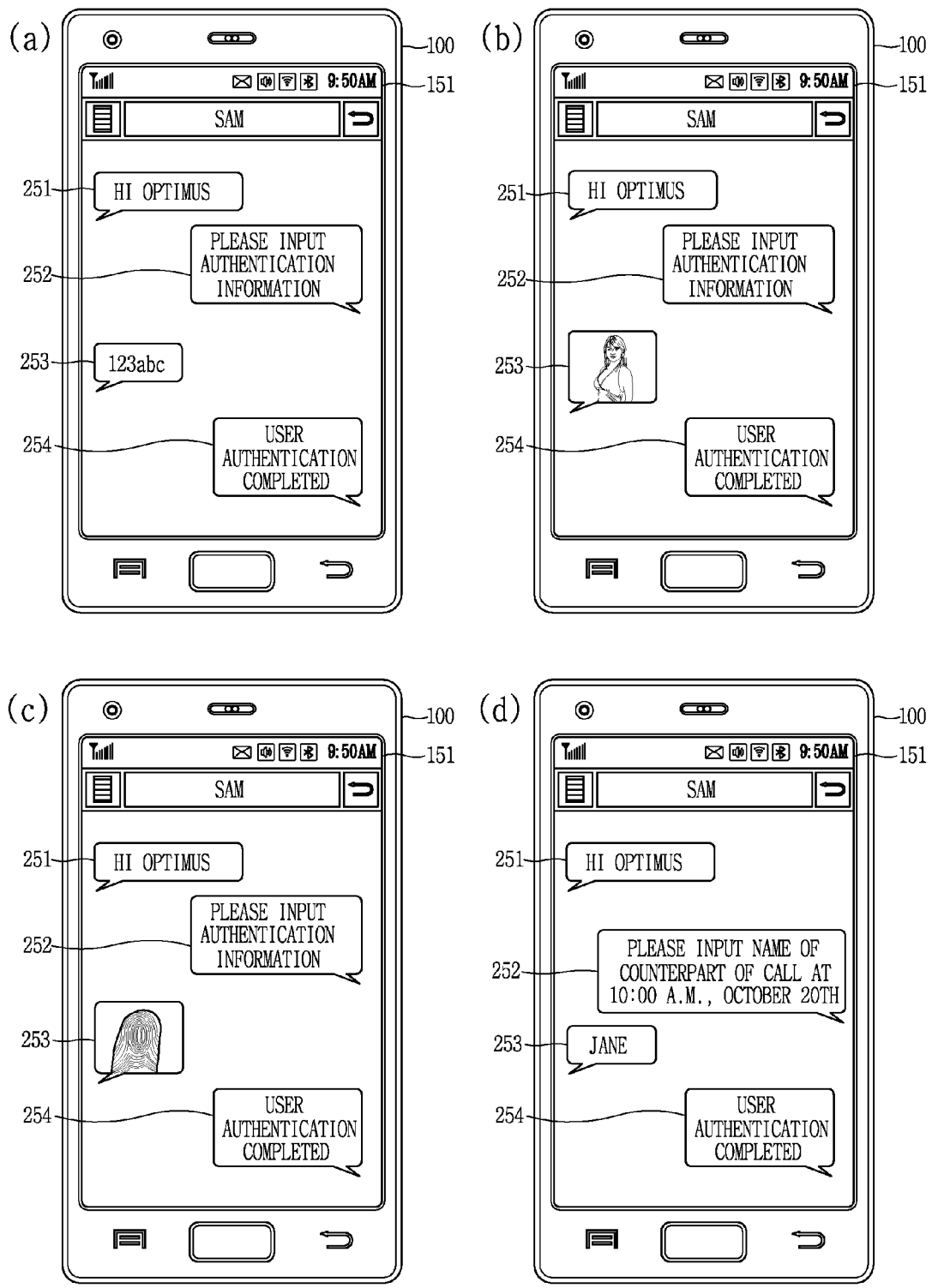

MOBILE TERMINAL AND CONTROL METHOD THEREOF

CROSS REFERENCE TO RELATED APPLICATIONS

Pursuant to 35 U.S.C. §119(a), this application claims the benefit of earlier filing date and right of priority to Korean Application No. 10-2012-0125480, filed on Nov. 7, 2012 and Korean Application No. 10-2013-0046963, filed on Apr. 26, 2013 the contents of which is incorporated by reference herein in its entirety.

BACKGROUND OF THE INVENTION

1. Field of the Invention

The present invention relates to a mobile terminal and, more particularly, to a mobile terminal capable of receiving a message, and a control method thereof.

2. Description of the Related Art

In general, terminals may be divided into a mobile terminal and stationary terminal according to whether or not terminals are movable. In addition, mobile terminals may be divided into a handheld terminal and a vehicle mount terminal according to whether or not users can directly carry it around.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device. Efforts are ongoing to support and increase the functionality of mobile terminals. Such efforts include software and hardware improvements, as well as changes and improvements in the structural components which form the mobile terminal.

Supported by such improvements, technologies of controlling a terminal by using an external electronic device have been developed. However, in order to control a terminal by using an electronic device, the electronic device and the terminal are required to be connected through a fixed line. If the electronic device and the terminal are away from each other, a complicated user authentication procedure is required to control a terminal by using an electronic device, causing user inconvenience.

SUMMARY OF THE INVENTION

As aspect of the present invention provides a mobile terminal capable of enhancing user convenience in controlling a mobile terminal by using an electronic device, and a control method thereof.

To achieve these and other advantages and in accordance with the purpose of the present invention, as embodied and broadly described herein, the present invention provides in one aspect a mobile terminal includes: a wireless communication unit configured to receive at least one of authentication information and a message from an external electronic device; an authenticating unit configured to perform user authentication by using the authentication information received from the electronic device; and a controller configured to, when the user authentication is performed, perform a control operation in response to a control command included in the received message, and transmit a message indicating the result of performing the control operation to the electronic device.

In an embodiment of the present invention, the authenticating unit may perform user authentication by using at least one of image data, audio data, and text data included in the message received from the electronic device.

In an embodiment of the present invention, the authenticating unit may determine whether the message received from the electronic device includes pre-set first text data, and may determine whether to recognize the received message as a preceding message to start user authentication according to the determination results.

In an embodiment of the present invention, when the received message is recognized as a message preceding for user authentication, the authenticating unit may determine whether to perform user authentication according to whether second text data used as a password is included in the received message.

In an embodiment of the present invention, when user authentication is performed, the authenticating unit may transmit a message indicating that user authentication has performed to the electronic device, and when the user authentication fails, the authenticating unit may transmit a message indicating that user authentication has failed to the electronic device.

In an embodiment of the present invention, the mobile terminal may further include a memory, wherein when user authentication fails continuously by a pre-set number of times, the authenticating unit may store identification information of the electronic device in the memory in order to filter a message received from the electronic device.

In an embodiment of the present invention, the controller may extract a control command included in the received message by using a natural language processing (NLP) algorithm.

In an embodiment of the present invention, the mobile terminal may further include: a memory, wherein the controller may detect at least one of information regarding a generated event and information stored in the memory on the basis of the control command, and transmit a message including the detected information to the electronic device.

In an embodiment of the present invention, although the control command is received, the controller may transmit a message including the detected information to the electronic device selectively according to a user setting.

In an embodiment of the present invention, the mobile terminal may further include: a body, wherein the detected information may include at least one of location information of the body, contact number information stored in the memory, schedule information stored in the memory, message information received from a counterpart, and call history information.

In an embodiment of the present invention, the controller may install a new application or change a user interface of a home screen on the basis of the control command.

In an embodiment of the present invention, the mobile terminal may further include: a display unit, wherein the controller may display records of performing the control operation on the display unit, and when at least one of the records of performing the control operation displayed on the display unit is selected, the controller may display information related to the selected control operation on the display unit.

In an embodiment of the present invention, the controller may display notification information indicating the presence of history of performing user authentication by the electronic device on the display unit.

In an embodiment of the present invention, the records of performing the control operation may include a message transmission record or a message check record according to the control command received from the electronic device, and the controller may display a message window indicating a message transmission result or a message check result according to the control command received from the electronic device such that it is discriminated from other message windows.

In an embodiment of the present invention, the controller may determine whether pre-set third text data is included in the message received from the electronic device, and when the third text data is included in the received message, the controller may disregard a control command received from the electronic device until when user authentication is newly performed.

In an embodiment of the present invention, after user authentication is performed, when a pre-set period of time has lapsed, the controller may disregard a control command received from the electronic device until when additional user authentication is performed.

To achieve these and other advantages and in accordance with the purpose of the present invention, as embodied and broadly described herein, the present invention provides in another aspect a control method of a mobile terminal, includes: receiving at least one of authentication information and a message from an external electronic device; performing user authentication by using the authentication information received from the electronic device; after the user authentication is performed, performing a control operation in response to a control command included in the received message; and transmitting a message indicating results of performing the control operation to the electronic device.

In an embodiment of the present invention, the performing of user authentication by using the authentication information received from the electronic device may include: performing user authentication by using at least one of image data, audio data, and text data included in the message received from the electronic device.

In an embodiment of the present invention, the control method may further include: displaying records of performing the control operation on a display unit; and when at least one of the records of performing the control operation displayed on the display unit is selected, displaying information related to the selected control operation on the display unit.

In an embodiment of the present invention, the control method may further include: displaying notification information indicating the presence of history of performing user authentication by the electronic device on the display unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 3 is a flow chart illustrating an example of a mobile terminal according to an embodiment of the present invention.

FIGS. 6A and 6B are conceptual views illustrating a user interface of the mobile terminal when user authentication information of the electronic device is received.

DETAILED DESCRIPTION OF THE INVENTION

Figure 1:
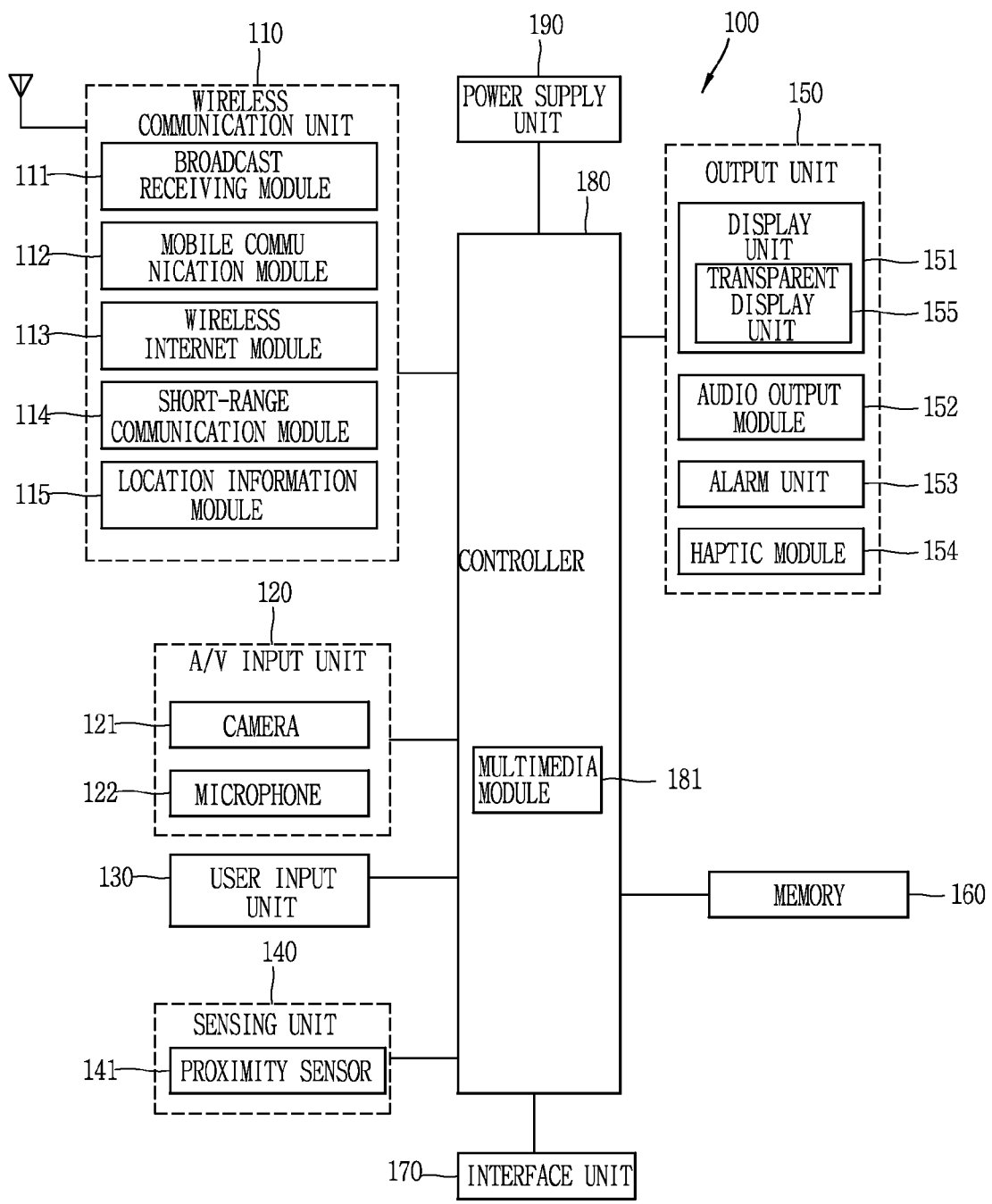
FIG. 1 is a block diagram of a mobile terminal according to an embodiment of the present invention.

Hereinafter, embodiments will be described in detail with reference to the accompanying drawings such that they can be easily practiced by those skilled in the art to which the present invention pertains. However, the present invention may be implemented in various forms and not limited to the embodiments disclosed hereinafter. Also, in order to clarify the present invention, parts irrespective of description will be omitted, and similar reference numerals are used for the similar parts throughout the specification.

Mobile terminals described in the present disclosure may include mobile phones, smart phones, notebook computers, digital broadcast terminals, PDAs (Personal Digital Assistants), PMPs (Portable Multimedia Player), navigation devices, and the like. However, it would be understood by a person skilled in the art that the configuration according to embodiments of the present invention can be also applicable to the fixed types of terminals such as digital TVs, desk top computers, and the like, except for any elements especially configured for a mobile purpose.

FIG. 1 is a block diagram of a mobile terminal 100 according to an embodiment of the present invention. With reference to FIG. 1, the mobile terminal 100 includes a wireless communication unit 110, an A/V (Audio/Video) input unit (referred to as a 'user tracking unit', hereinafter) 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

Hereinafter, the elements 110 to 190 of the mobile terminal 100 will be described in detail as follows.

The wireless communication unit 110 typically includes one or more modules allowing for radio communication between the mobile terminal 100 and a wireless communication system or between the mobile terminal 100 and a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel. The broadcast associated information may refer to information associated with a broadcast channel, a broadcast program or a broadcast service provider. The broadcast associated information may also be provided via a mobile communication network and, in this case, the broadcast associated information may be received by the mobile communication module 112. Broadcast signals and/or broadcast-associated information received via the broadcast receiving module 111 may be stored in the memory 160.

The mobile communication module 112 transmits and/or receives radio signals to and/or from at least one of a base station, an external terminal, and a server. Such radio signals may include a voice call signal, a video call signal or various types of data according to text and/or multimedia message transmission and/or reception.

The wireless Internet module 113 supports wireless Internet access for the mobile terminal 100. This module may be internally or externally coupled to the mobile terminal 100. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location of the mobile terminal 100. A typical example of the location information module is a GPS (Global Positioning System).

With reference to FIG. 1, the A/V input unit 120 may include a camera 121 and a microphone 122. The camera 121 processes image frames of still pictures or video obtained by an image sensor in a video capturing mode or an image capturing mode. The image frames processed by the camera 121 may be displayed on a display unit 151. The processed image frames may be stored in the memory 160 or transmitted to the outside via the wireless communication unit 110. Two or more cameras 121 may be provided according to a usage environment.

The microphone 122 may process an audio signal input from an external source into electrical voice data in a phone call mode, a recording mode, a voice recognition mode, and the like. The audio (voice) data processed by the microphone 122 may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad, a jog wheel, a jog switch, and the like.

The sensing unit 140 detects a current status of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may include a proximity sensor 141. Also, the sensing unit 140 may include a touch sensor (not shown) for sensing a touch operation with respect to the display unit 151.

The touch sensor may have a form of a touch film, a touch sheet, a touch pad, and the like. The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When the touch sensor and the display unit 151 are overlaid in a layered manner, the display unit 151 may function as both an input device and an output device. Such a display unit 151 may also be called a 'touch screen'.

When there is a touch input through the touch screen, a corresponding signal (signals) are transmitted to a touch controller. The touch controller processes the signals transmitted from the touch sensor and transmits corresponding data to the controller 180. Accordingly, the controller 180 may recognize which portion of the display unit 151 has been touched.

When the touch screen is an electrostatic type touch screen, the touch screen may detect proximity of an object (or a detection target) based on a change in an electric field according to the proximity of the object. Such a touch screen may be classified as a proximity sensor 141.

The proximity sensor 141 is a sensor for detecting the presence or absence of an object by using the force of electromagnetism or infrared rays without a physical contact. Thus, the proximity sensor 141 has a considerably longer life span compared with a contact type sensor, and it can be utilized for various purposes. Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like.

In the following description, for the sake of explanation, recognition of an object to be sensed positioned to be close to the touch screen will be called a 'proximity touch', while recognition of actual contacting of an object to be sensed on the touch screen will be called a 'contact touch'.

The proximity sensor 141 senses a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units according to its particular desired embodiment. For example, a plurality of display units may be separately or integrally disposed on one surface of the mobile terminal, or may be separately disposed on mutually different surfaces.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. A video signal or an audio signal may also be output through the display unit 151 or the audio output module 152, so the display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180. The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, a method of processing a user input with respect to the mobile terminal 100 will be described.

The user input unit 130 is manipulated to receive a command for controlling the operation of the mobile terminal 100 and may include a plurality of manipulation units. The manipulation units may be generally referred to as a manipulating portion, and various methods and techniques can be employed for the manipulation portion so long as they can be operated by the user in a tactile manner.

Various types of visual information may be displayed on the display unit 151. The information may be displayed in the form of character, number, symbol, graphic, icon, etc. In order to input the information, at least one of the character, number, symbol, graphic and icon is displayed in a certain arrangement so as to be implemented in the form of a keypad. Such keypad may be so-called 'soft key'.

The display unit 151 may be operated as a whole region or may be divided into a plurality of regions and accordingly operated. In the latter case, the plurality of regions may be operation in association with each other. For example, an output window and an input window may be displayed at upper and lower portions of the display unit 151, respectively. The output window and the input window are regions allotted for outputting or inputting information, respectively. Soft keys including numbers for inputting a phone number, or the like, may be outputted to the input window. When the soft key is touched, a number corresponding to the touched soft key is displayed on the output window. When the manipulation unit is manipulated, a call connection with respect to a phone number displayed on the output window is attempted, or text displayed on the output window may be input to an application.

The display unit 151 or the touch pad may be configured to sense touch scrolling. The user may move a cursor or a pointer positioned on an entity, e.g., an icon or the like, displayed on the display unit 151 by scrolling the display unit 151 or the touch pad. In addition, when the user moves his fingers on the display unit 151 or the touch pad, a path along which the user's fingers move may be visually displayed on the display unit 151. This may be useful in editing an image displayed on the display unit 151.

One function of the terminal may be executed in case where the display unit 151 and the touch pad are touched together within a certain time range. The both touches may be clamping the terminal body with the user's thumb and index finger. The one function executed in this case may be, for example, activation or deactivation of the display unit 151 or the touch pad.

Figure 2A:
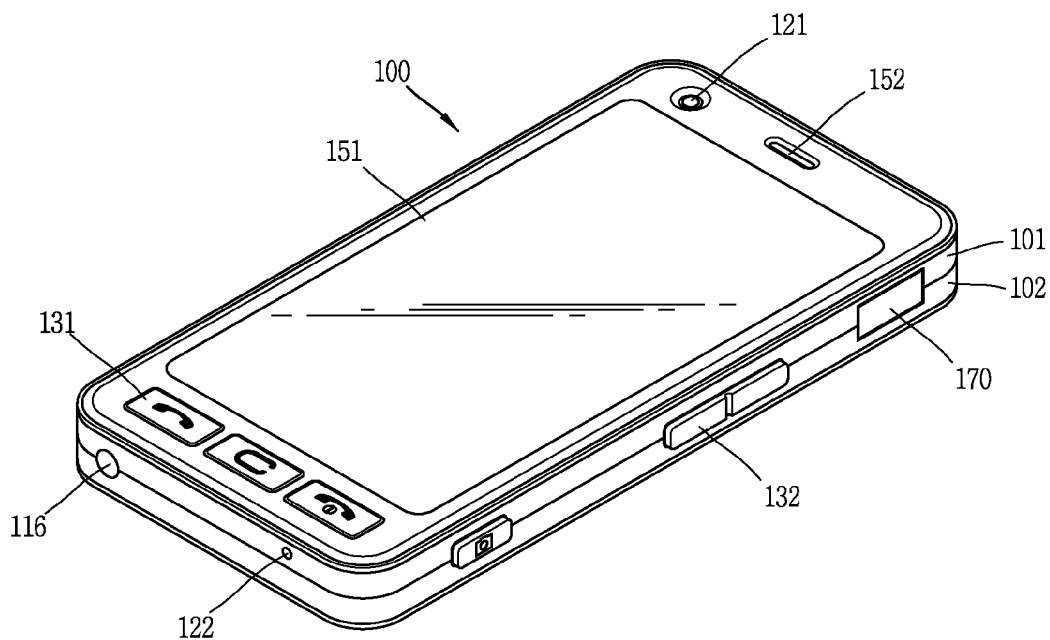
FIGS. 2A and 2B are perspective views illustrating the exterior of the mobile terminal according to an embodiment of the present invention.
Figure 2B:
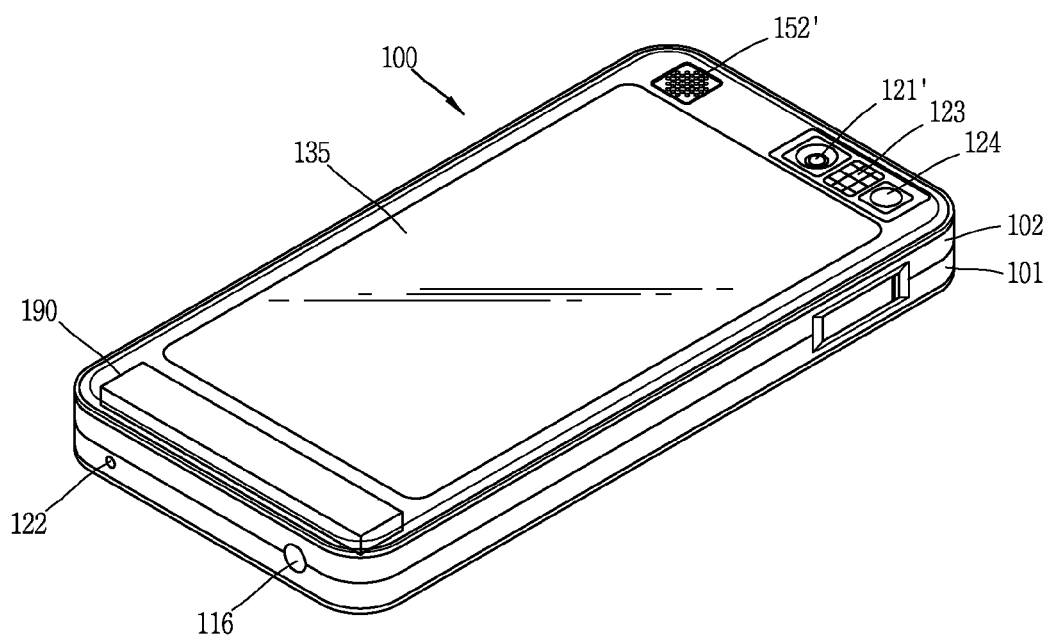

FIGS. 2A and 2B are perspective views showing an external appearance of the mobile terminal 100 according to an embodiment of the present invention. Specifically, FIG. 2A shows a front surface and one lateral surface of the mobile terminal 100, and FIG. 2B shows a rear surface and another lateral surface of the mobile terminal 100.

With reference to FIG. 2A, the mobile terminal 100 has a bar type terminal body. However, without being limited thereto, the present invention may also be applicable to a slide type mobile terminal, a folder type mobile terminal, a swing type mobile terminal, a swivel type mobile terminal, and the like, in which two or more bodies are coupled to be movable relatively.

The terminal body includes a case (or casing, housing, cover, etc.) constituting an external appearance of the terminal body. The case may be divided into a front case 101 and a rear case 102. Various electronic components are installed in the space between the front case 101 and the rear case 102. One or more intermediate cases may be additionally disposed between the front case 101 and the rear case 102.

The cases may be formed by injection-molding a synthetic resin or may be made of a metallic material such as stainless steel (STS) or titanium (Ti), etc.

The display unit 151, the audio output module 152, the camera 121, and the user input unit 130 (see FIG. 1), the microphone 122, the interface 170, and the like, may be located on the terminal body, namely, mainly, on the front case 101.

The display unit 151 occupies the most portion of the front surface of the front case 101. The audio output module 152 and the camera 121 are disposed at a region adjacent to one end portion of the display unit 151, and a first user input unit 131 and the microphone 122 are disposed at a region adjacent to the other end portion of the display unit 151. A second user input unit 132 and the interface 170 may be disposed on the sides of the front case 101 and the rear case 102.

The user input unit 130 is manipulated to receive commands for controlling the operation of the mobile terminal 100, and may include a plurality of manipulation units 131 and 132.

The first or second manipulation unit 131 or 132 may receive various commands. For example, the first manipulation unit may receive commands such as start, end, scroll, or the like, and the second manipulation unit 132 may receive commands such as adjustment of size of a sound outputted from the audio output module 152, conversion to a touch recognition mode of the display unit 151, and the like.

With reference to FIG. 2B, a rear camera 121' may additionally be disposed on a rear surface of the terminal body, namely, on the rear case 102. The rear camera 121' may have an image capture direction which is substantially opposite to that of the camera 121 (See FIG. 2A), and may support a different number of pixels (i.e., have a different resolution) than the front camera 121.

For example, the front camera 121 may have a relatively small number of pixels, and the rear camera 121' may have a relatively large number of pixels. Thus, the use of the front camera 121 for a video call can reduce the size of transmission data in case of capturing the user's face and transmitting the captured image to a counterpart in real time. Meanwhile, the rear camera 121' may be used for the purpose of storing a high quality image.

Meanwhile, the cameras 121 and 121' may be installed on the terminal such that they are rotated or popped up.

A flash 123 and a mirror 124 may be additionally disposed adjacent to the camera 121'. When the user captures an image of the subject with the rear camera 121', the flash 123 illuminates the subject. The mirror 124 allows the user to see himself when he wants to capture his own image (i.e., self-image capturing) by using the rear camera 121'.

An audio output unit 152' may be additionally disposed on the rear surface of the terminal body. The rear audio output unit 152' may implement a stereoscopic function along with the audio output module 152 (See FIG. 2A), and may be used for implementing a speaker phone mode during call communication.

A broadcast signal receiving antenna 116 may be additionally disposed on the side of the terminal body in addition to an antenna that supports call communications. The antenna 116 forming a portion of the broadcast reception module 111 (See FIG. 1) may be installed to be drawn out of the terminal body.

A power supply unit 190 for supplying power to the mobile terminal 100 may be installed on the terminal body. The power supply unit 190 may be installed in the terminal body or may be directly detached from the outside of the terminal body.

A touch pad 135 for detecting a touch may be additionally mounted on the rear case 102. Such touch pad may be configured to be light-transmissive like the display unit 151 (See FIG. 2A). Also, a rear display unit may be additionally mounted on the touch pad 135 in order to output visual information. In this case, information output from both of the front display unit 151 and the rear display unit may be controlled by the touch pad 135.

The touch pad 135 is operated in relation to the display unit 151. The touch pad 135 may be disposed to be parallel to the rear side of the display unit 151. The touch pad 135 may have the same size as or smaller than the display unit 151.

Meanwhile, technologies of controlling the mobile terminal 100 by using an external electronic device have been developed. However, in order to control the mobile terminal 100 by using an electronic device, the electronic device and the mobile terminal 100 are required to be connected through a fixed line. If the electronic device and the mobile terminal 100 are away from each other, a complicated user authentication procedure is required to control the mobile terminal 100 by using the electronic device, causing user inconvenience.

Thus, hereinafter, the mobile terminal 100 and a control method thereof capable of enhancing user convenience in controlling the mobile terminal 100 by using an electronic device will be described in detail with reference to the accompanying drawings.

FIG. 3 is a flow chart illustrating an example of the mobile terminal 100 (please see FIG. 1) according to an embodiment of the present invention. The mobile terminal 100 includes a wireless communication unit 110 (please see FIG. 1), an authenticating unit 182 (please see FIG. 1), a controller 180 (please see FIG. 1), and a display unit 151 (please see FIG. 1).

Referring to FIG. 3, first, at least one of authentication information and a message is received from an external electronic device in step S110.

The wireless communication unit 110 of the mobile terminal 100 may receive a message from the electronic device. Here, the message may include a message received by using at least one a short message service (SMS) and a multimedia message service (MMS).

The message received from the electronic device may include authentication information, may include a control command, or may include both authentication information and a control command.

Meanwhile, the wireless communication unit 110 may receive information through a different method rather than a message. For example, the wireless communication unit 110, while performing a video call with the electronic device, receive information through the video call, or the wireless communication unit 110, while performing a vice call with the electronic device, may receive information through the voice call.

Here, the electronic device may be an electronic device previously set by the user of the mobile terminal 100 or may be a certain electronic device not set by the user. If the user wants to remotely connect the mobile terminal 100 only to a pre-set electronic device, when the wireless communication unit 110 receives authentication information from an electronic device which has not been set, the controller 180 may disregard the received authentication information.

Next, user authentication is performed by using the authentication information received from the electronic device in step S120.

As described above, the authentication information may be included in the message received from the electronic device. Also, the authentication information may be received through a different method, rather than through a message. The authentication information may be included in the form of text data or may be included in the form of at least one of image data and voice data.

In the case in which the authentication information is included in the form of text data in the message, the authenticating unit 182 may determine whether text data used as authentication information is included in the message received from the electronic device. In the case in which text data is included in the received message, the authenticating unit 182 may perform user authentication. Also, the authenticating unit 182 may transmit a message indicating that user authentication was performed, to the electronic device.

If text data is not included in the received message, the authenticating unit 182 may transmit a message indicating that user authentication has filed to the electronic device, rather than performing user authentication. In a case in which a message including text data, rather than text data used as authentication information, is received by more than a pre-set number of times, the authenticating unit 182 may store identification information of a corresponding electronic device in a black list.

Thereafter, when user authentication is performed, a control operation is performed in response to a control command included in the received message in step S130, and a message indicating the results of performing the control operation is transmitted to the electronic device in step S140.

As mentioned above, the control command may be included in the message received from the electronic device. Also, the control command may be received through a different method, rather than a message. Also, the control command may be included in the form of text data in the message or may be included in the form of at least one of image data and voice data.

The control command may be received in the form of a language that may be immediately recognized by the controller 180 or may be received in the form of a natural language. When the control command is received in the form of a natural language, the controller 180 may extract the control command included in the received message by using a natural language processing (NLP) algorithm.

The NLP algorithm refers to an artificial intelligence technique enabling the mobile terminal 100 or a computer to understand, generate, and analyze a human language. An operation of understanding a natural language refers to an operation of converting a daily life language of human beings into a format that can be processed by the mobile terminal 100 or the computer through a semantic analysis, a conversation analysis, or the like.

When the control command is extracted through the NLP algorithm, the controller 180 may perform a control operation by using the extracted control command.

For example, on the basis of the control command, the controller 180 may detect at least one of information related to a generated event and information stored in the memory 160 (please see FIG. 1), and transmit the detected information to the electronic device.

Also, on the basis of the control command, the controller 180 may install a new application or change a user interface of a home screen.

As described above, according to an embodiment of the present invention, the mobile terminal 100 may perform user authentication on the electronic device by using the text data included in the message received from the electronic device. Namely, since user authentication is performed without performing a complicated authentication procedure, a user manipulation may be reduced in performing the authentication procedure. As a result, battery resource of the mobile terminal 100 can be effectively used.

Also, according to an embodiment of the present invention, even when the electronic device and the mobile terminal 100 are away from each other, the mobile terminal 100 may be controlled by using the electronic device. Thus, even in a situation in which the user cannot use the mobile terminal 100, event information occurring in the mobile terminal 100 of the user can be checked by using the electronic device (e.g., a tablet PC or a mobile terminal of a different user). As a result, user convenience can be enhanced.

Figure 4:
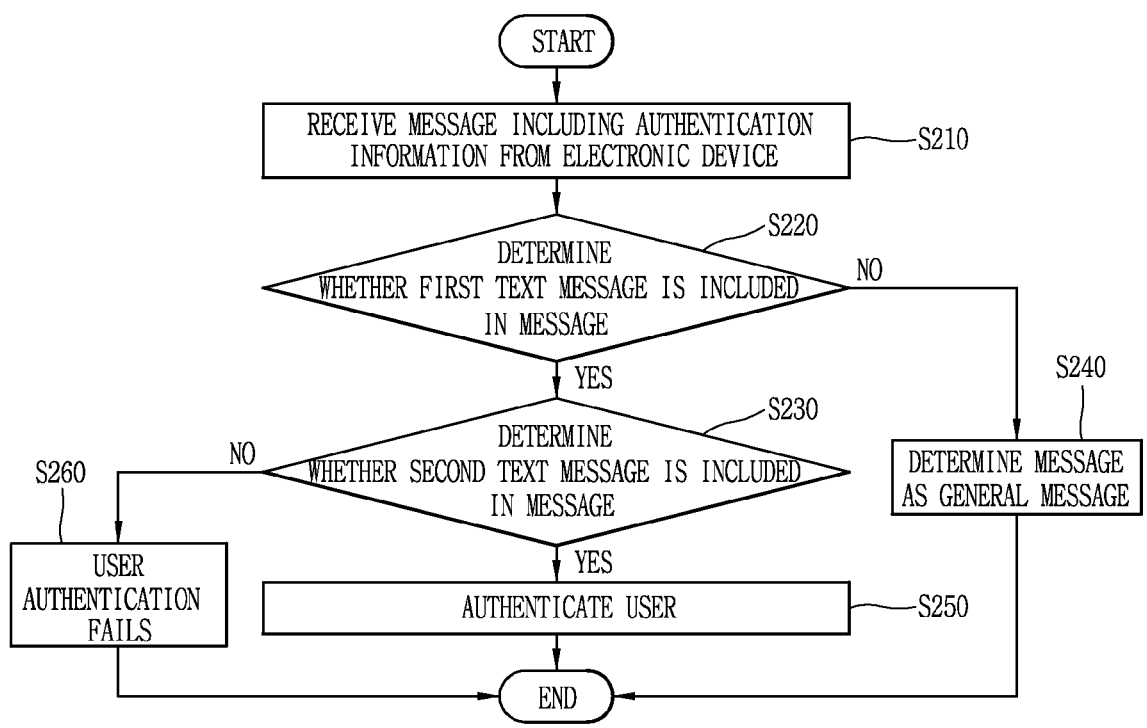
FIG. 4 is a flow chart illustrating a process of performing authentication on a user of an electronic device.

FIG. 4 is a flow chart illustrating a process of performing authentication on a user of an electronic device. The mobile terminal 100 includes the wireless communication unit 110 (please see FIG. 1), the authenticating unit 182 (please see FIG. 1), the controller 180 (please see FIG. 1), and the display unit 151 (please see FIG. 1).

Referring to FIG. 4, first, a message including authentication information is received from an electronic device in step S120. Here, content already described above with reference to FIG. 3 will be omitted.

Next, whether first text data is included in the message is determined in step S220.

As mentioned above, the authentication information may be included in various forms in the message. In a case in which authentication information is included in the form of text data in the message, the authenticating unit 182 may determine whether pre-set first text data is included in the message received from the electronic device.

When first text data is not included in the received message, the authenticating unit 182 may determine a message to be received thereafter as a general message (S240).

Meanwhile, when the pre-set first text data is included in the received message, the authenticating unit 182 may determine whether second text data used as a password is included in the received message (S230).

Here, both the first text data and the second text data may be included in a single message or may be included in different messages. In the latter case, namely, when the second text data is not included in the received message, the authenticating unit 182 may determine whether the second text data used as a password is included in a message to be received thereafter. Namely, when the first text data is included in the received message, the authenticating unit 182 may determine a message to be received thereafter is a password message for user authentication.

When the second text data is not included in the received message, or when the second text data is not included in a message received thereafter, user authentication of the electronic device may fail (S260).

Meanwhile, when the second text data is included in the received message or when the second text data is included in a message received thereafter, the authenticating unit 182 may perform user authentication on the electronic device (S250).

Although not shown, when user authentication is performed, the wireless communication unit 110 may transmit a message indicating that user authentication was performed, to the electronic device. Similarly, when user authentication fails, the wireless communication unit 110 may transmit a message indicating that user authentication failed, to the electronic device.

Figure 5:
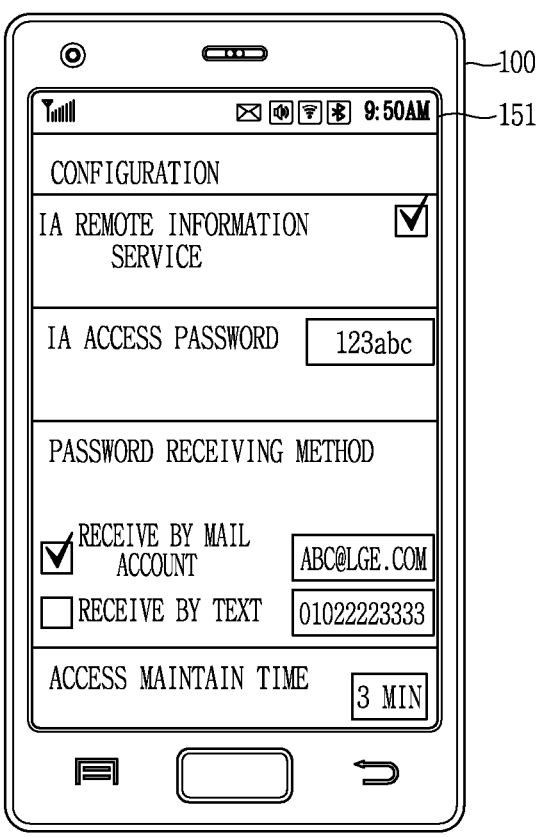
FIG. 5 is a conceptual view illustrating a configured screen of the mobile terminal that precedes for remote connection to an electronic device.

FIG. 5 is a conceptual view illustrating a configured screen of the mobile terminal that precedes for remote connection to an electronic device. The mobile terminal 100 includes the wireless communication unit 110 (please see FIG. 1), the authenticating unit 182 (please see FIG. 1), the controller 180 (please see FIG. 1), and the display unit 151 (please see FIG. 1).

The present invention may be performed by using an intelligent agent (IA). Referring to FIG. 5, the controller 180 may receive information regarding conditions for a remote connection to the electronic device and configuration information.

As illustrated, the controller 180 may allow the user to select whether to use an IA remote information service. When the user ticks off an IA remote information service usage item, the embodiments of the present invention may be applied. Meanwhile, in a case in which the user does not tick off the IA remote information service usage item, although the wireless communication unit 110 receives authentication information from the electronic device, the controller 180 may disregard the received authentication information and determine it as a general message.

Although not shown, the controller 180 may allow the user to select an electronic device for using the IA remote information service. If the user wants to remotely connect the mobile terminal 100 only to a pre-set electronic device, although the wireless communication unit 110 receives authentication information from an electronic device which has not been set, the controller 180 may disregard the received authentication information.

Thereafter, the controller 180 may receive an IA access password. The controller 180 may receive a type of an IA access password. The type of IA access password may include at least one of text data, image data, and audio data.

Here, when the text data is selected, a password including a pre-set character or number may be set. When the image data is selected, a fingerprint image or a face image of the user may be set. When the audio data is selected, user's voice information may be set.

Thereafter, the controller 180 may receive a password receiving method. When the electronic device has a wrong password by more than a pre-set number of times, a password may be provided to the user. Here, the provided password may be a pre-set password or may be a one-time password (OTP).

Thereafter, the controller 180 may receive an access maintaining duration. The access maintaining duration refers to a duration until when a remote connection to the electronic device is terminated after user authentication is performed. For example, when 'three minutes' is set, after the lapse of three minutes since user authentication is performed on the electronic device, a remote connection to the electronic device may be automatically terminated.

Figure 6B:
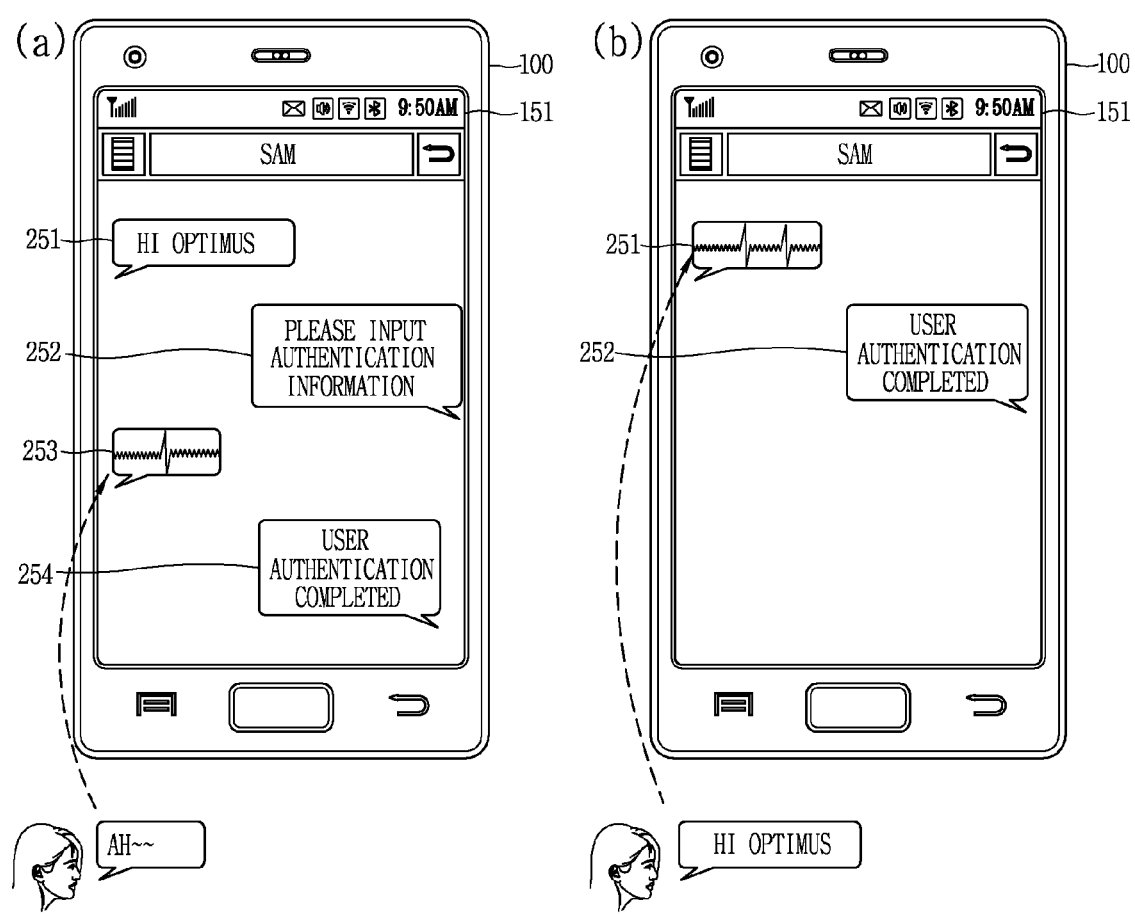

FIGS. 6A and 6B are conceptual views illustrating a user interface of the mobile terminal when user authentication information is received by the electronic device. The mobile terminal 100 includes the wireless communication unit 110 (please see FIG. 1), the authenticating unit 182 (please see FIG. 1), the controller 180 (please see FIG. 1), and the display unit 151 (please see FIG. 1).

The wireless communication unit 110 of the mobile terminal 100 may receive a message from an electronic device. The received message may include authentication information.

In detail, referring to (a) of FIG. 6A, when a first message 251 including first text data (e.g., "Hi Optimus") is received from the electronic device, the authenticating unit 182 may determine that the first message 251 is a message preceding for user authentication. Namely, the authenticating unit 182 may determine a message received from the electronic device thereafter as a password message for user authentication.

If the first text data is not included in the first message 251, the authenticating unit 182 may determine a message to be received thereafter as a general message.

Thereafter, the wireless communication unit 110 may transmit a second message 252 requesting authentication information to the electronic device. This step may be omitted. Also, although not shown, hint information related to a password may be included in the second message 252.

Thereafter, when a third message 253 including second text data (e.g., "123abc") used as a password is received from the electronic device, the authenticating unit 182 may determine whether the second text data corresponds to a password. When it is determined that the second text data corresponds to a password, the authenticating unit 182 may perform user authentication. Accordingly, the mobile terminal 100 may be remotely connected to the electronic device.

Thereafter, the wireless communication unit 110 may transmit a fourth message 254 indicating that user authentication was performed, to the electronic device. This step may be omitted. Also, although not shown, an access maintaining duration (e.g., three minutes") may be indicated in the fourth message 254.

Also, referring to (b) of FIG. 6A, a third message 253 including a user image may be received from the electronic device. The authenticating unit 182 may compare the received user image with a pre-set image and determine whether to perform user authentication.

Also, referring to (c) of FIG. 6A, a third message 253 including a fingerprint image of the user may be received from the electronic device. The authenticating unit 182 may compare the received fingerprint image with a pre-set fingerprint image and determine whether to perform user authentication.

Meanwhile, referring to (d) of FIG. 6A, the wireless communication unit 110 may transmit a second message 252 asking information (e.g., "a name of a counterpart talked on the phone at 10:00 a.m. October, 20<sup>th</sup>) related to the mobile terminal 100 to the electronic device. A user who uses the electronic device may transmit a third message 253 including the answer (e.g., "JANE") to the question included in the second message 252, to the mobile terminal 100.

Thereafter, the authenticating unit 182 may determine whether to perform user authentication on the basis of right or wrong of the answer included in the third message 253.

Meanwhile, referring to (a) of FIG. 6B, a third message 253 in the form of a audio message including audio data of the user may be received from the electronic device. The authenticating unit 182 may analyze the audio data by using at least one of the number of vibrations of the audio data, a shape of a wave of the audio data, and amplitude of the wave of the audio data. The authenticating unit 182 may determine whether a speaker of the received audio data is a user according to the analysis results, and determine whether to perform user authentication.

Also, referring to (b) of FIG. 6B, in a case in which a first message 251 in the form of an audio message including first audio data (e.g., "Hi, Optimus") is received from the electronic device, the authenticating unit 182 may analyze the first audio data and may determine whether to perform user authentication immediately. Namely, when a message including audio data is received from the electronic device, the authenticating unit 182 may omit an additional user authentication process and perform user authentication through analysis of the audio data.

Figure 7:
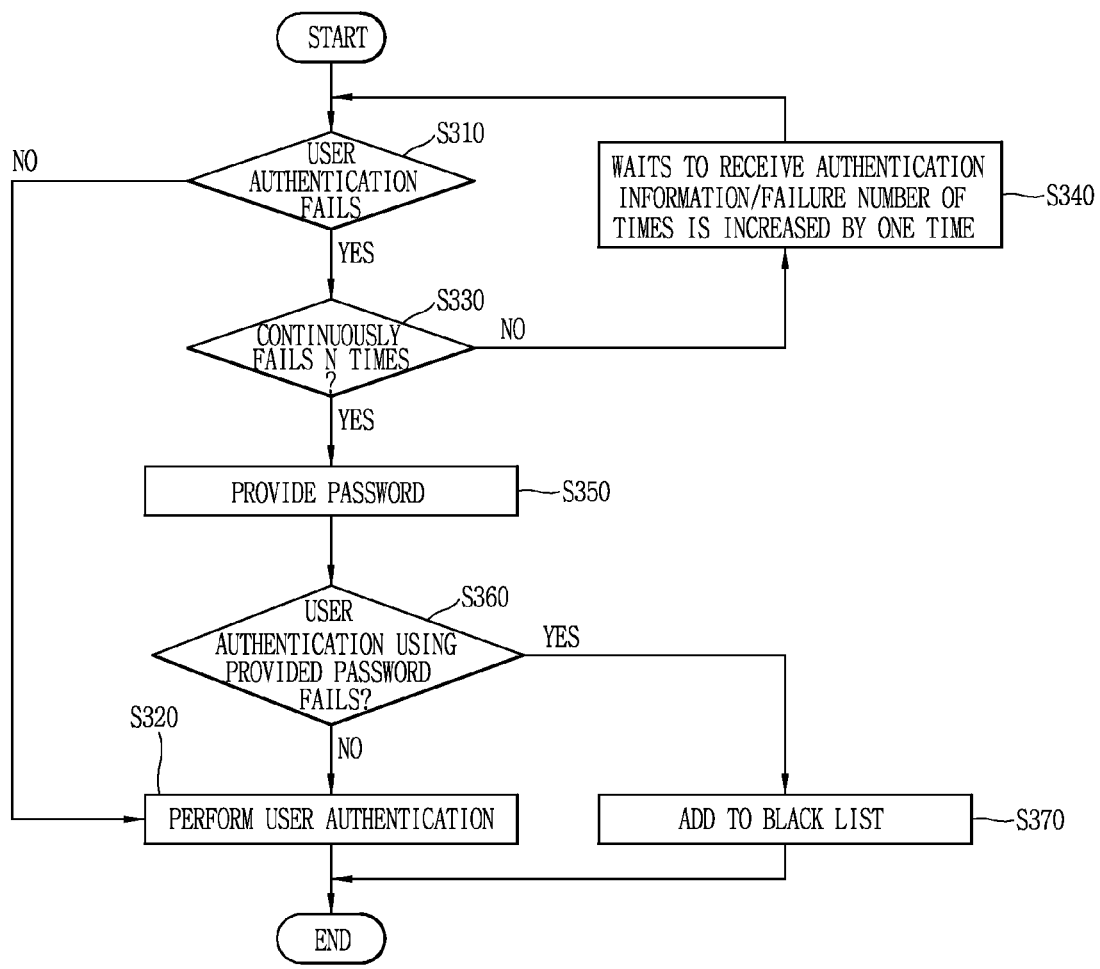
FIG. 7 is a flow chart illustrating an example in which authentication of a user of an electronic device continuously fails.

FIG. 7 is a flow chart illustrating an example in which authentication of a user of an electronic device continuously fails. The mobile terminal 100 includes the wireless communication unit 110 (please see FIG. 1), the authenticating unit 182 (please see FIG. 1), the controller 180 (please see FIG. 1), and the display unit 151 (please see FIG. 1).

Referring to FIG. 7, it is determined whether user authentication fails in step S310. When user authentication is successful, the user of the electronic device may be confirmed in step S320. Meanwhile, when user authentication fails, it is determined whether user authentication has failed continuously by a pre-set number of times (e.g., three times) in step S330.

When user authentication has failed but it has failed by less than the pre-set number of times, the authenticating unit 182 may increase the number of times of failure one time. Also, the authenticating unit 182 may wait to receive authentication information (S340). For example, when second text data included in a third message 254 received from the electronic device does not correspond to a password, the authenticating unit 182 may wait to receive a new message including a password.

However, when user authentication has failed continuously by the pre-set number of times (e.g., three times), the authenticating unit 182 may provide a password to the user (S350). Here, the provided password may be a pre-set password or may be a new one time password (OTP).

Thereafter, it is determined whether user authentication using the password provided to the user fails in step S360. When the user authentication is successful, user authentication is performed (S320). Meanwhile, when the user authentication fails, namely, when user authentication fails continuously one more time (e.g., four times) than the pre-set number of times, the authenticating unit 182 may add identification information of the electronic device to a black list (S370). Here, the identification information of the electronic device may include at least one of contact number information of the electronic device and unique IMEI information of the electronic device.

IMEI refers to an identification number allotted to mobile terminals to allow them to identify one another in a global system for mobile communications (GSM). IMEI is made up of 15 digits including a type approval code, a final combined code, and a serial number.

The number of times of failure of user authentication for performing the steps S310 to S370 as described above in FIG. 7 may be set by the user or may be internally set in the mobile terminal 100. Also, the number of times of failure of user authentication for performing the steps S310 to S370 may be changed according to a type of the electronic device.

Figure 8:
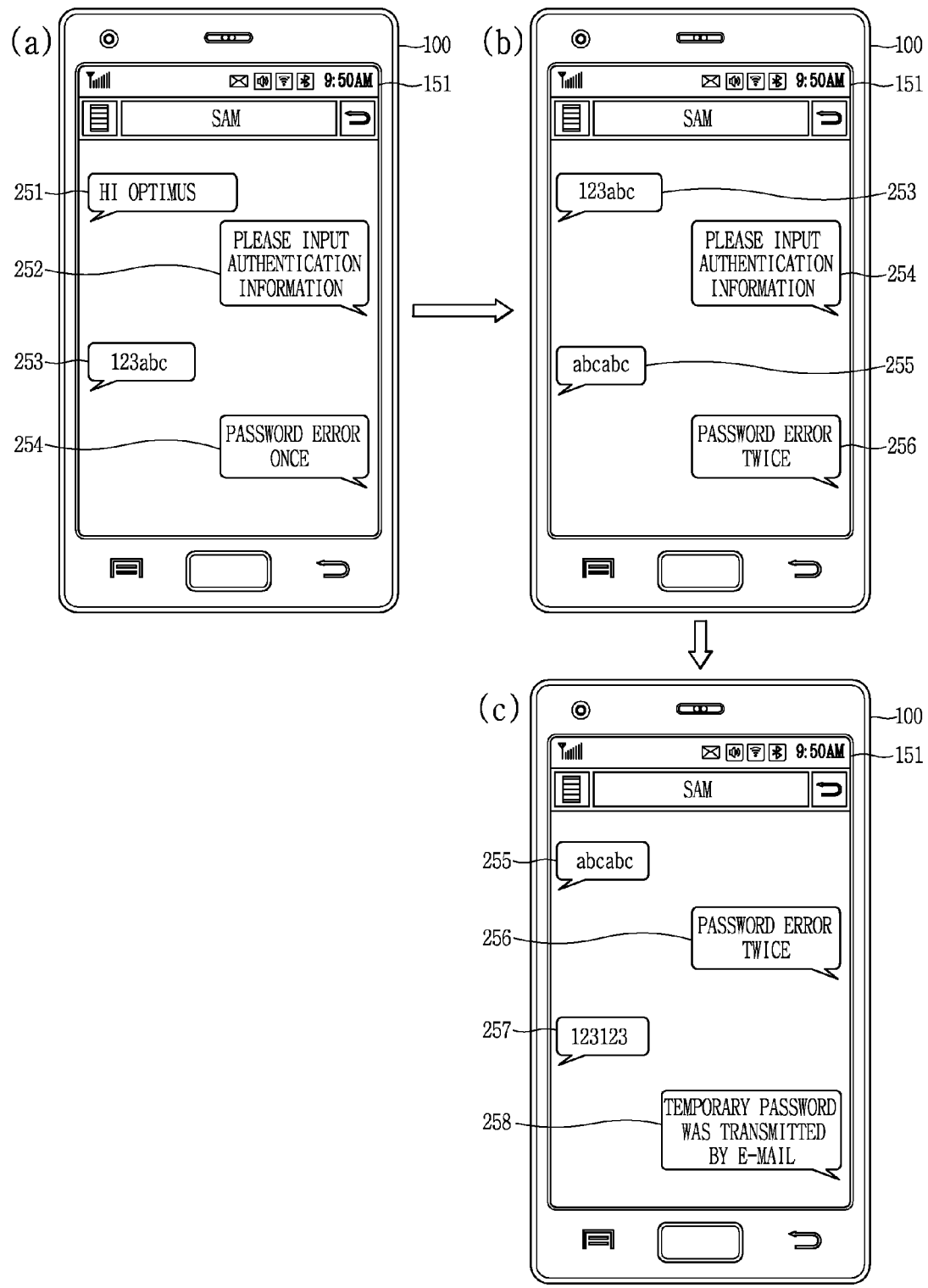
FIGS. 8 and 9 are conceptual views illustrating a user interface of the mobile terminal when authentication of a user of an electronic device continuously fails.
Figure 9:
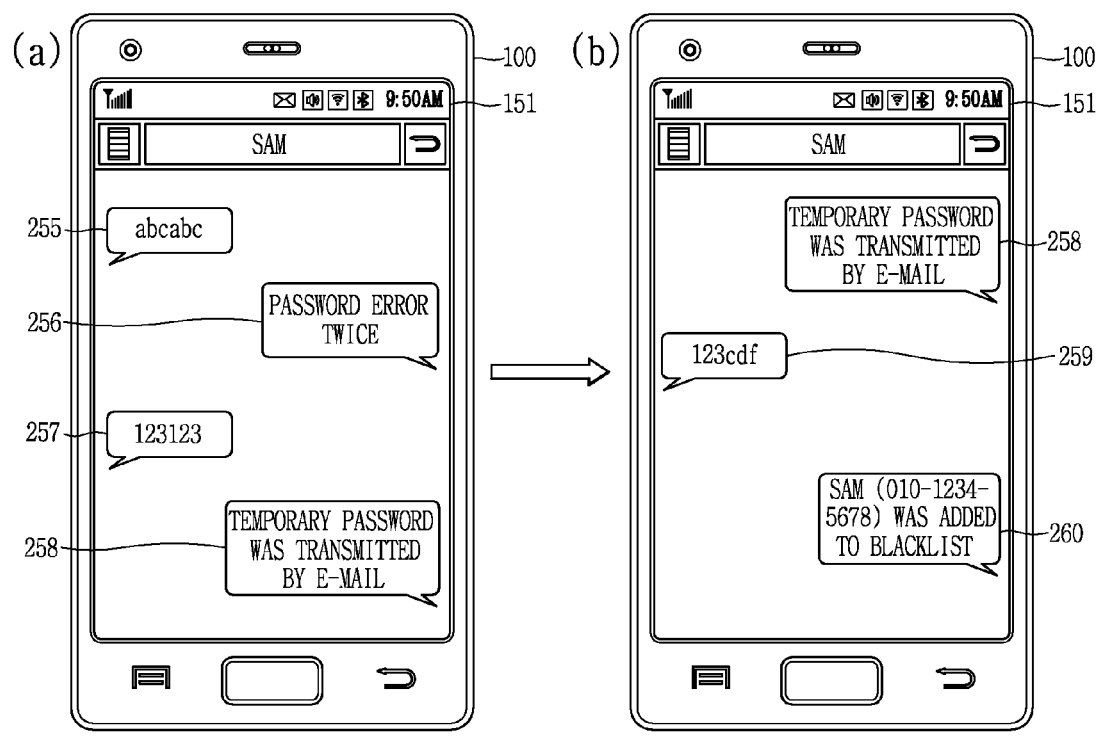

FIGS. 8 and 9 are conceptual views illustrating a user interface of the mobile terminal when authentication of a user of an electronic device continuously fails. The mobile terminal 100 includes the wireless communication unit 110 (please see FIG. 1), the authenticating unit 182 (please see FIG. 1), the controller 180 (please see FIG. 1), and the display unit 151 (please see FIG. 1).

FIG. 8 illustrates step S320 of waiting to receive authentication information and step S330 of providing a password to the user, among the steps S320 to S340 described above with reference to FIG. 7.

Referring to FIG. 8(a), when a first message 251 including first text data (e.g., "Hi Optimus") is received from an electronic device, the authenticating unit 182 may determine the message 251 as a message preceding for user authentication. Namely, the authenticating unit 182 may determine a message received from the electronic device thereafter as a password message for user authentication.

Next, the wireless communication unit 110 may transmit a second message 252 requesting authentication information to the electronic device.

Thereafter, when a third message 253 including second text data (e.g., "123abc") used as a password is received from the electronic device, the authenticating unit 182 may determine whether the second text corresponds to a password.

When the second text data does not correspond to a password, the wireless communication unit 110 may transmit a fourth message indicating that password was wrong to the electronic device. In this case, as illustrated, the fourth message 254 may include the number of times of the wrong password (e.g., "one time").

Thereafter, referring to FIG. 8(b), a fifth message 255 including second text data (e.g., "abcabc") may be received from the electronic device. In a case in which the second text data included in the fifth message 255 does not correspond to a password, the wireless communication unit 110 may transmit a sixth message 256 indicating that password was wrong to the electronic device.

Thereafter, referring to FIG. 8(c), a seventh message 257 including second text data (e.g., "123123") may be received from the electronic device. In a case in which even the second text data included in the seventh message 257 does not correspond to a password, the authenticating unit 182 may generate a temporary password and transmit the temporary password to a previously designated e-mail address.

Also, the wireless communication unit 110 may transmit an eighth message 258 indicating that the temporary password was transmitted to the previously designated e-mail address, to the electronic device.

FIG. 9 illustrates step (S340) of adding identification information of an electronic device to a black list among the steps (S320 to S340) described above with reference to FIG. 7.

Referring to FIG. 9(a), the wireless communication unit 110 may transmit a temporary password to a previously designated e-mail address. Thereafter, referring to FIG. 9(b), a seventh message 257 including second text data (e.g., "123123") may be received from the electronic device. When the second text data included in the seventh message 257 does not correspond to a password, the authenticating unit 182 may transmit a temporary password to the previously designated e-mail address. Also, the wireless communication unit 110 may transmit an eighth message 258 indicating that a temporary password has been transmitted to the previously designated e-mail address, to the electronic device.

Thereafter, referring to FIG. 9(b), a ninth message 259 including second text data (e.g., "123cdf") may be received from the electronic device. When the second text data included in the ninth message 259 does not correspond to a password, the authenticating unit 182 may add identification information of the electronic device to a black list. As described above, the identification information of the electronic device may include at least one of contact number information of the electronic device and unique IMEI information of the electronic device.

When the identification information of the electronic device is added to the black list, a message to be received from the electronic device may be filtered. For example, a message to be received from the electronic device may be recognized as a general message or a message to be received from the electronic device may be interrupted.

Figure 10:
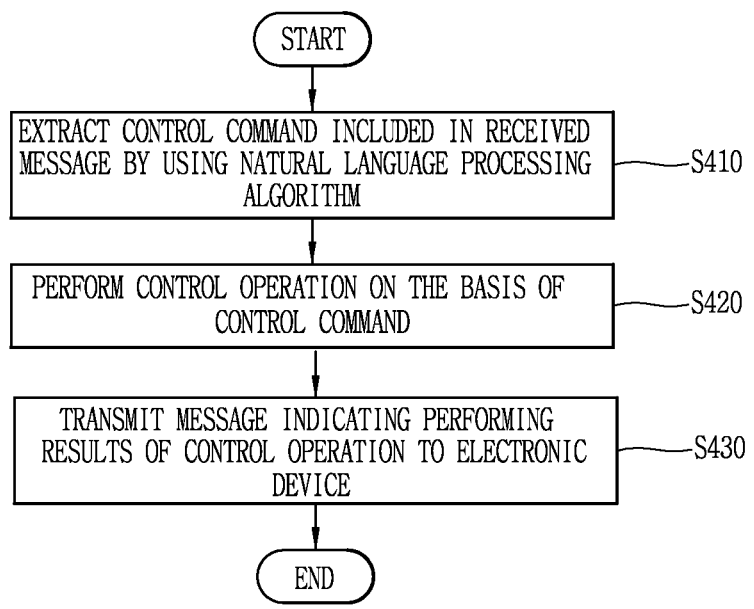
FIG. 10 is a flow chart illustrating an example in which a control command is received from an electronic device.

FIG. 10 is a flow chart illustrating an example in which a control command is received from an electronic device. The mobile terminal 100 includes the wireless communication unit 110 (please see FIG. 1), the authenticating unit 182 (please see FIG. 1), the controller 180 (please see FIG. 1), and the display unit 151.

Referring to FIG. 10, a control command included in the received message is extracted by using an NLP algorithm.

Although not illustrated, at least one of the embodiments for starting the NLP algorithm may be performed before the operation (S410) of extracting a control command included in the received message.

After the user authentication of the electronic device is performed, a text message including text data may be received. When the text message is received, the LNLP algorithm may start to extract a control command included in the text data.

Meanwhile, an audio message including audio data may be received from the electronic device. When audio data is received from the electronic device, the controller 180 may convert audio data into text data in order to perform NLP algorithm. Thereafter, the controller 180 may start the NLP algorithm to extract the control command which has been converted into text data.

For example, after a call signal is received from the electronic device, audio data received from the electronic device may be stored in a voice mailbox. When the audio data is stored, the controller 180 may convert the stored audio data into text data and may start a NLP algorithm to extract a control command from the text data.

In this manner, the controller 180 may receive a message including a control command from the electronic device, and the control command may be received in the form of a natural language. When a message is received, a control command included in the message may be extracted through the NLP algorithm. Meanwhile, the control command may be received in the form of a language that may be directly recognizable by the controller 180.

Next, on the basis of the control command, step (S420) of performing a control operation and step (S430) of transmitting a message indicating results of performing the control operation to the electronic device are performed.

In detail, when a control command is extracted through the NLP algorithm, the controller 180 may perform a control operation on the basis of the extracted control command.

For example, on the basis of the control command, the controller 180 may detect at least one of information related to a generated event and information stored in the memory 160 (please see FIG. 1), and transmit a message including the detected information to the electronic device.

Here, the detected information may include at least one of location information of the body of the mobile terminal 100, contact number information stored in the memory 160, schedule information stored in the memory 160, message information received from a counterpart, and call history information.

Meanwhile, although not shown, although a control command is received, the controller 180 may transmit a message including the detected information to the electronic device or may not selectively according to a user setting. For example, when the user sets such that call history information is not transmitted to the electronic device, although the electronic device requests call history information, the controller 180 may not transmit the call history information to the electronic device.

Figure 11:
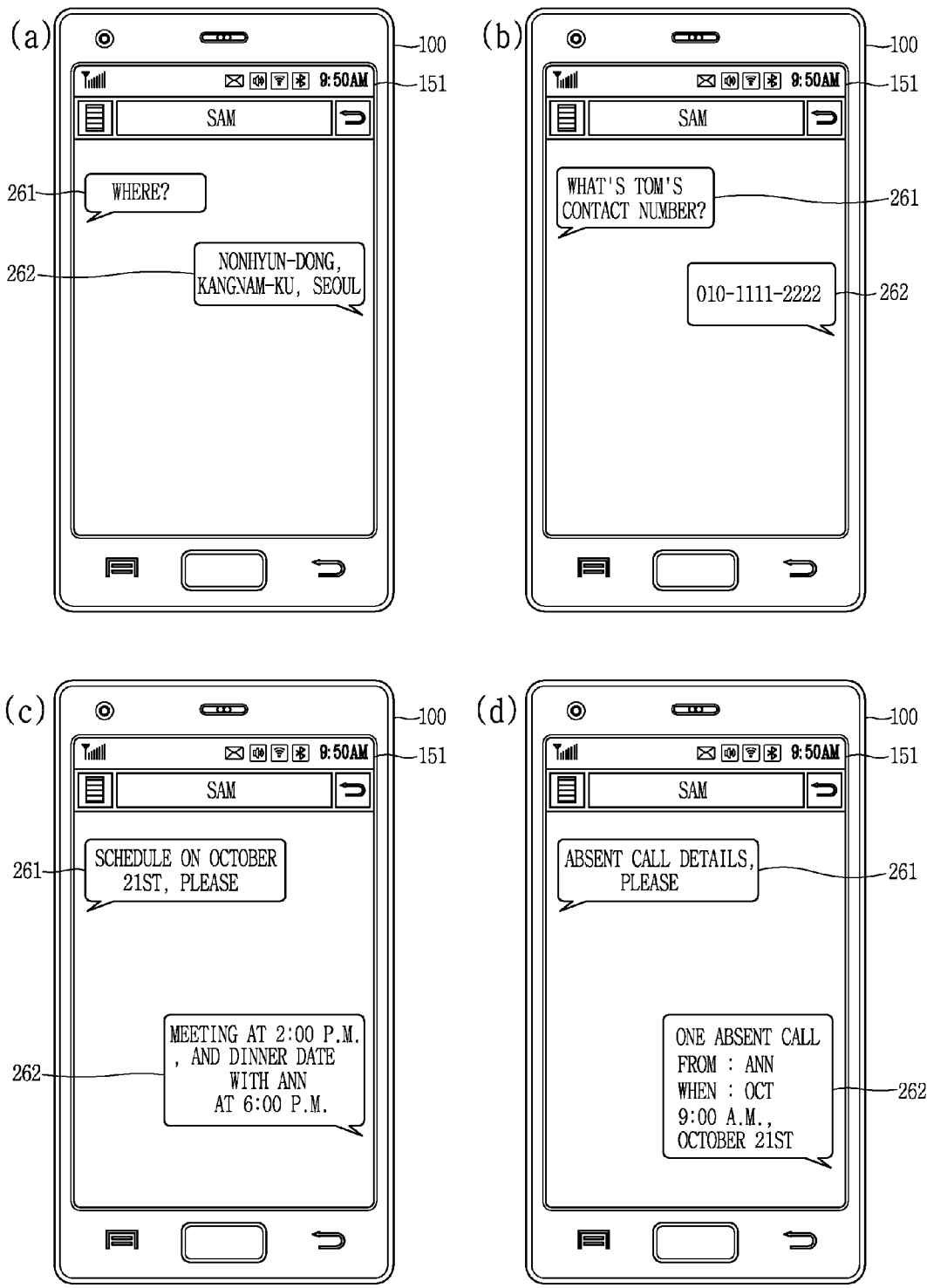
FIGS. 11 through 13 are conceptual views illustrating a user interface of the mobile terminal in case of receiving a control command from an electronic device.
Figure 12:
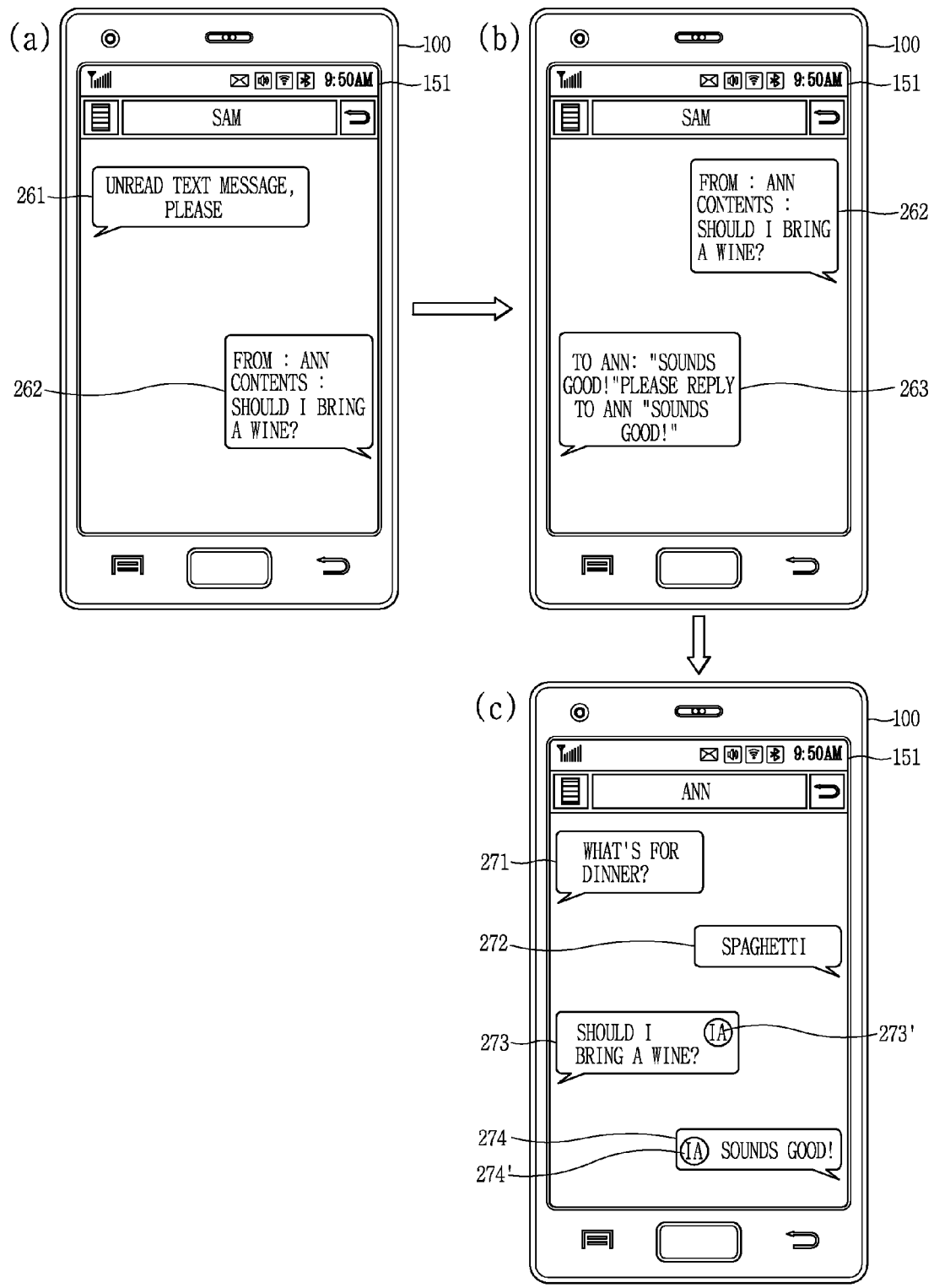
Figure 13:
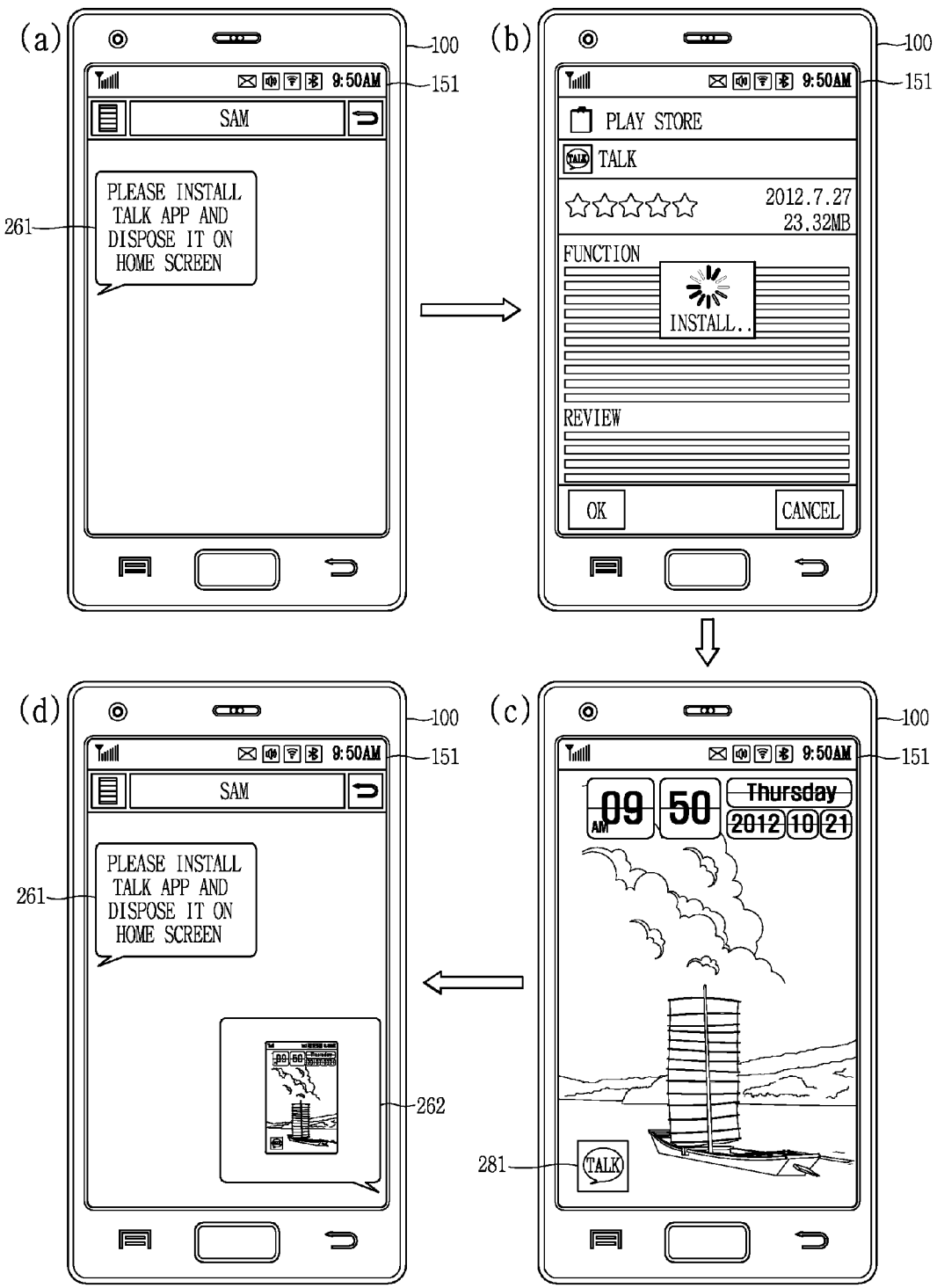

FIGS. 11 through 13 are conceptual views illustrating a user interface of the mobile terminal in case of receiving a control command from an electronic device. The mobile terminal 100 includes the wireless communication unit 110 (please see FIG. 1), the authenticating unit 182 (please see FIG. 1), the controller 180 (please see FIG. 1), and the display unit 151 (please see FIG. 1).

Referring to FIG. 11, the controller 180 may detect at least one of information regarding a generated event and information stored in the memory 160 (please see FIG. 1) and transmit a message including the detected information to the electronic device.

For example, referring to FIG. 11(a), a first message 261 requesting location information of the body of the mobile terminal 100 may be received. As illustrated, the first message 261 may include a natural language such as "Where you are?". The controller 180 may recognize that the electronic device requests location information of the body by using a NLP algorithm.

According to the recognition results, the controller 180 may obtain location information of the body by using the wireless communication unit 110. Thereafter, the wireless communication unit 110 may transmit a second message 252 including obtained location information to the electronic device.

Also, referring to FIG. 11(b), when a first message 261 requesting contact number information of a certain counterpart (e.g., "TOM") is received from the electronic device, the controller 180 may search the memory 160 for contact number information of the "TOM". Thereafter, the wireless communication unit 110 may transmit a second message 262 including searched contact number information to the electronic device.

Also, referring to FIG. 11(c), when a first message 251 requesting schedule information (e.g., "schedule information of October 21") is received from the electronic device, the controller 180 may search the memory 160 for schedule information of "October 21". Thereafter, the wireless communication unit 110 may transmit the second message 262 including the searched schedule information to the electronic device.

Also, referring to FIG. 11(d), when a first message 261 requesting an absence call history is received from the electronic device, the controller 180 may search the memory 160 for absence call history. Thereafter, the wireless communication unit 110 may transmit a second message 262 including the searched absence call history to the electronic device.

Meanwhile, referring to FIG. 12(a), when a message 261 requesting content of unread reception text message is received from the electronic device, the controller 180 may detect unread reception text message from the memory 160 and the wireless communication unit 110 may transmit a second message 262 including the detected text message to the electronic device.

The user who uses the electronic device may transmit a control command to the mobile terminal 100. For example, referring to FIG. 12(b), the user of the electronic device may transmit a control command instructing the mobile terminal 100 to transmit a text message including content such as "Sounds Goods?" to "ANN" to the mobile terminal 100.

Thereafter, referring to FIG. 12(c), on the basis of the control command included in a third message 263 received from the electronic device, the controller 180 may of the mobile terminal 10 may transmit a text message including the content such as "Sounds Goods?" to "ANN".

Meanwhile, the controller 180 may display a message window indicating a message transmission result or a message check result according to the control command received from the electronic device such that it is differentiated from other message windows.

For example, as illustrated in FIG. 12(c), among a plurality of message windows 271 to 274, objects 273' and 274' may be displayed in the message window 273 indicating a message checked by the user through the electronic device and the message window 274 indicating a message transmitted by the user by using the electronic device.

Accordingly, the user may intuitionally recognize the results of performing a control operation according to the control command of the electronic device through the mobile terminal 100.

Meanwhile, referring to FIG. 13, the controller 180 may install a new application or change a user interface of a home screen on the basis of a control command.

In detail, referring to FIG. 13(a), when a first message 261 requesting installation of an application (e.g., "TALK" application) and disposition of it on a home screen is received from the electronic device, the controller 180 may access a network or a server to download the "TALK" application as illustrated in FIG. 13(b).

Also, as illustrated in FIG. 13(c), the controller 180 may dispose the downloaded "TALK" application on the home screen.

Thereafter, the controller 180 may obtain a capture image of the home screen. As illustrated in FIG. 13(d), the wireless communication unit 110 may transmit a second message 262 including a capture image of the home screen to the electronic device.

Figure 14:
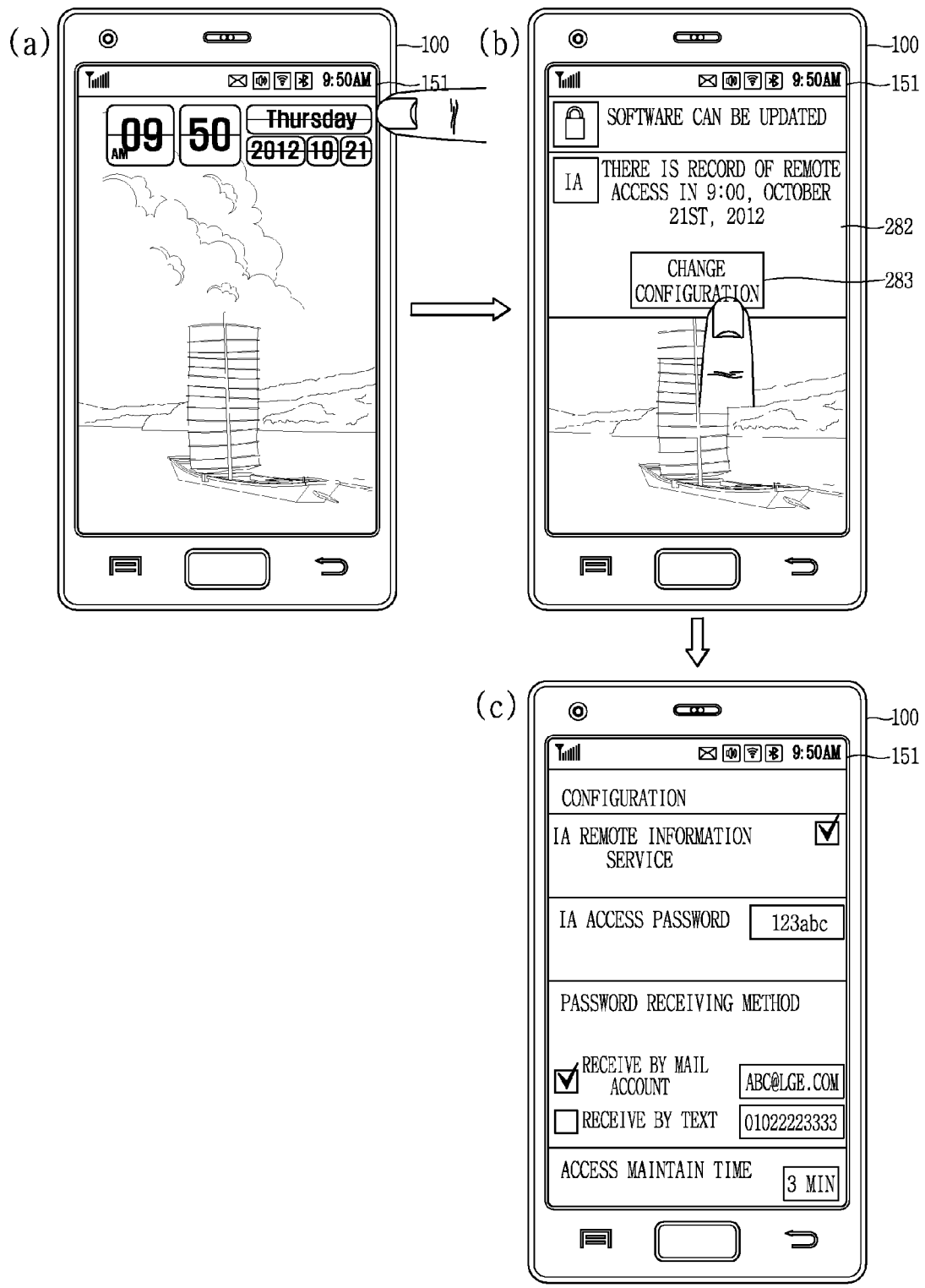
FIGS. 14 and 15 are conceptual views illustrating a user interface when records of performing a control operation according to a control command received from an electronic device are displayed on the mobile terminal.
Figure 15:
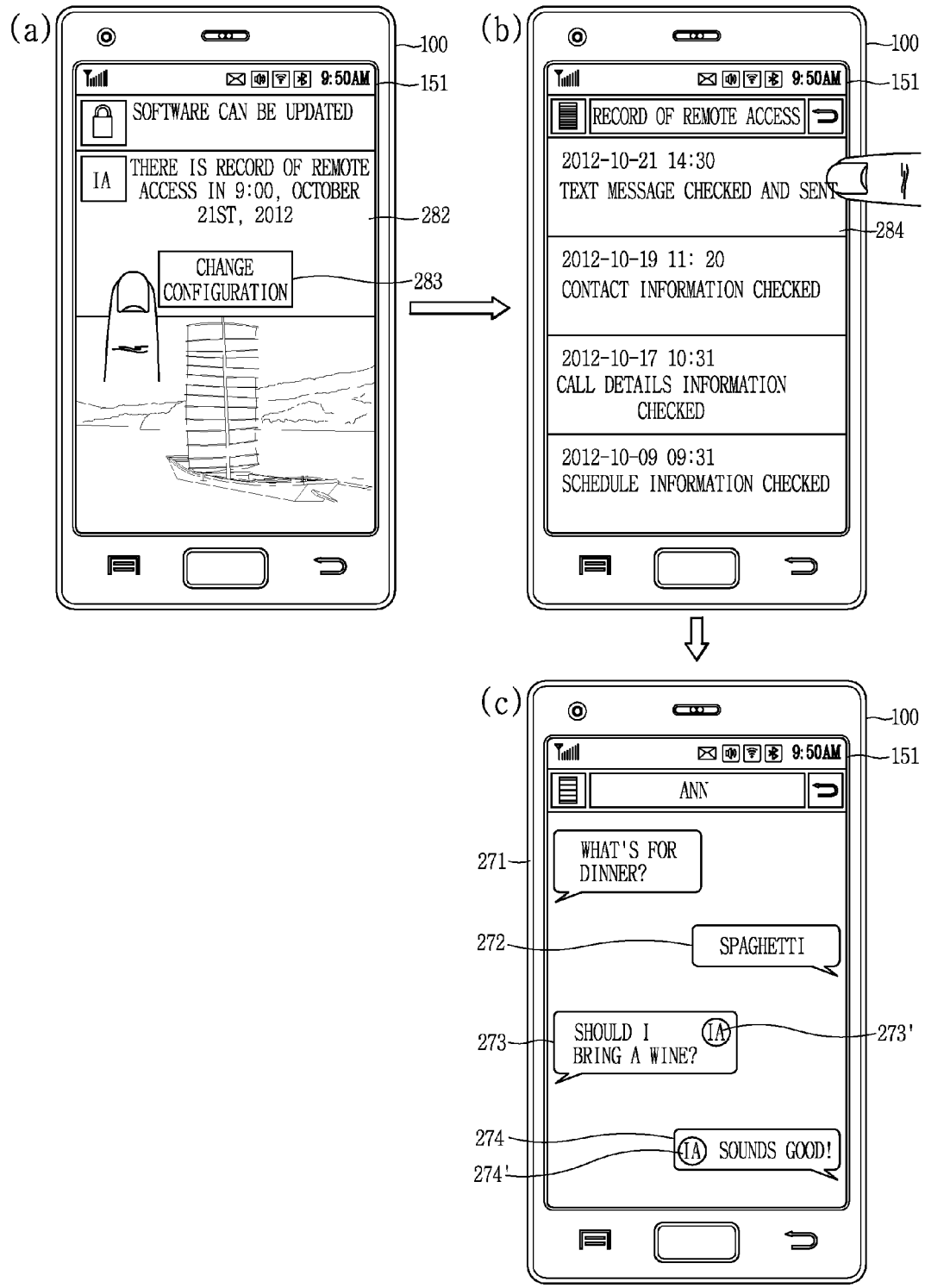

FIGS. 14 and 15 are conceptual views illustrating a user interface when records of performing a control operation according to a control command received from an electronic device are displayed on the mobile terminal. The mobile terminal 100 includes the wireless communication unit 110 (please see FIG. 1), the authenticating unit 182 (please see FIG. 1), the controller 180 (please see FIG. 1), and the display unit 151 (please see FIG. 1).

Referring to FIG. 14, the controller may display notification information regarding history of performing user authentication by the electronic device, namely, notification information indicating the presence of a remote access record, on the display unit 151.

For example, as illustrated in FIGS. 14(a) and 14(b), when a touch input applied to the display unit 151 is sensed, the controller 180 may display an indicator bar on the display unit 151. The indicator bar may include notification information.

Here, the notification information may include at least one of notification information indicating that software updating is possible and notification information indicating that there is a remote access record.

Meanwhile, together with the notification information 282 indicating the presence of a remote access record among notification information included in the indicator bar, an icon 283 corresponding to a function of changing a setting for a remote access may be displayed.

In this case, when the icon 283 is selected, as illustrated in FIG. 14(*c*), a configuration screen for receiving condition and configuration information for executing a remote connection to the electronic device may be displayed on the display unit 151. The user may set at least one of whether to use an IA remote information service, an IA access password, a method for receiving a password when a password is wrong, and an IA remote access maintaining duration.

Referring to FIG. 15, the controller 180 may display records of performing a control operation by the electronic device on the display unit 151.

For example, as illustrated in FIGS. 15(*a*) and 15(*b*), when notification information 282 indicating the presence of a remote access record is selected in the indicator bar displayed on the display unit 151, the controller 180 may display records of performing a control operation on the display unit 151.

The records of performing a control operation may include at least one of a type of a control operation, a duration of performing a control operation, and identification information of an electronic device which has issued a control operation.

When any one 284 of the records of performing a control operation displayed on the display unit 151 is selected, the controller 180 may display information regarding a selected control operation on the display unit 151 as illustrated in FIG. 15(*c*).

For example, when a text message check and transmission record 284 is selected from the records of performing a control operation is selected, the controller 180 may display a message window 274 indicating a message checked by the user through the electronic device and a message window 274 indicating a message transmitted by the user by using the electronic device on the display unit 151.

Meanwhile, as illustrated, a plurality of message windows 271 to 274 may be displayed on the display unit 151. In this case, objects 273' and 274' may be displayed in the message window 273 indicating a message checked by the user through the electronic device and the message window 274 indicating a message transmitted by the user by using the electronic device, so that the message windows 273 and 274 may be discriminated from other message windows 271 and 272.

Figure 16:
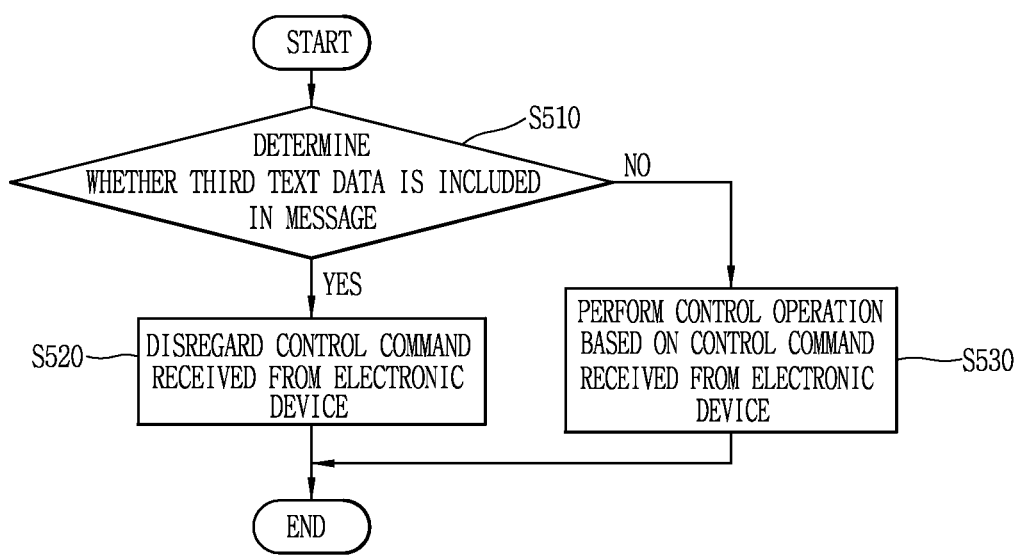
FIG. 16 is a flow chart illustrating an example in which a remote connection to an electronic device is terminated.

FIG. 16 is a flow chart illustrating an example in which a remote connection to an electronic device is terminated. The mobile terminal 100 includes the wireless communication unit 110 (please see FIG. 1), the authenticating unit 182 (please see FIG. 1), the controller 180 (please see FIG. 1), and the display unit 151 (please see FIG. 1).

Referring to FIG. 16, first, it is determined whether third text data is included in a message in step S510.

Here, the third text data refers to text data previously set for terminating a remote connection to the electronic device. The controller 180 may determine whether the third text data is included in a message received from the electronic device.

When the third text data is not included in the received message, the controller 180 may terminate the remote connection to the electronic device (S520). Namely, the controller 180 may disregard a control command received from the electronic device until when user authentication with respect to the electronic device is newly performed. Thereafter, the controller 180 may determine a message received from the electronic device, as a general message.

Meanwhile, when the third text data is not included in the received message, the controller 180 may perform a control operation on the basis of a control command included in a message received from the electronic device (S530).

Figure 17:
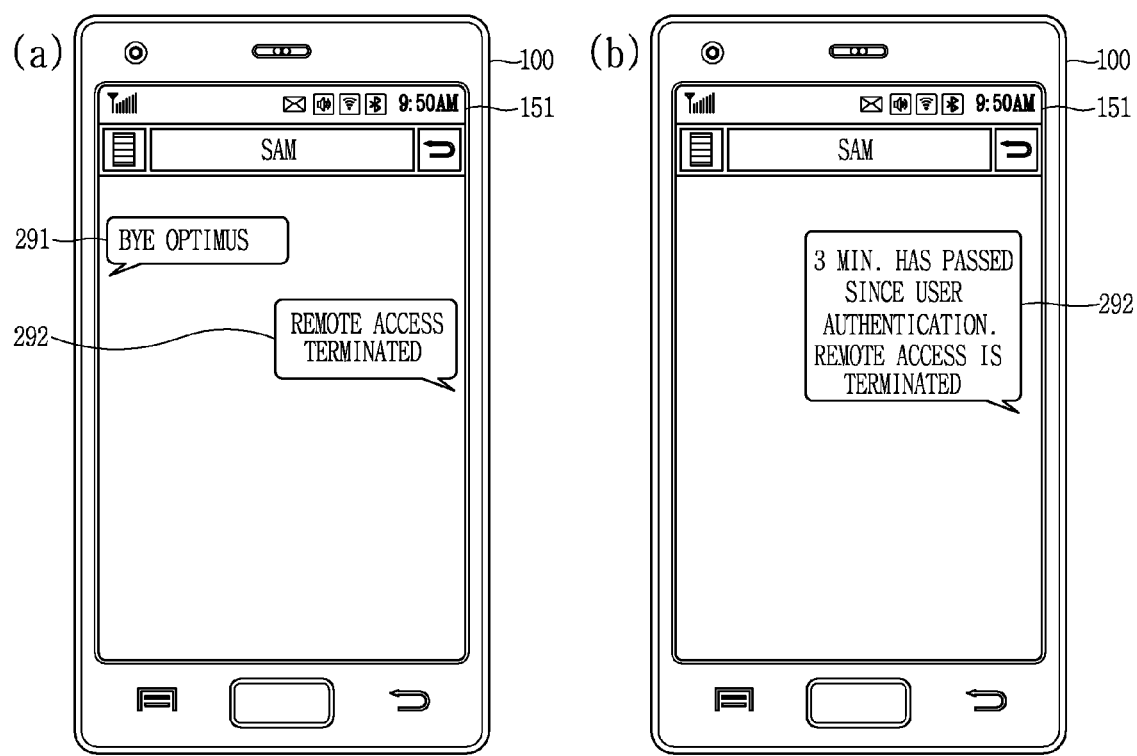
FIG. 17 is a conceptual view illustrating a user interface of the mobile terminal when the remote connection to the electronic device is terminated.

FIG. 17 is a conceptual view illustrating a user interface of the mobile terminal when the remote connection to the electronic device is terminated. The mobile terminal 100 includes the wireless communication unit 110 (please see FIG. 1), the authenticating unit 182 (please see FIG. 1), the controller 180 (please see FIG. 1), and the display unit 151 (please see FIG. 1).

Referring to FIG. 17(*a*), when a first message 291 including third text data (e.g., "Bye Optimus") is received from the electronic device, the controller 180 may determine the first message 291 as a message for terminating the remote connection to the electronic device. Namely, the controller 180 may determine a message received from the electronic device thereafter, as a general message.

Thereafter, the wireless communication unit 110 may transmit a second message 292 indicating that the remote connection is terminated to the electronic device. This step may be omitted.

Meanwhile, referring to FIG. 17(*b*), although a message including the third text data is not received from the electronic device, when a pre-set period of time has elapsed, the controller 180 may terminate the remote connection to the electronic device. Namely, the controller 180 may disregard a control command received from the electronic device until when user authentication with respect to the electronic device is newly performed.

In detail, after user authentication with respect to the electronic device is performed, when a pre-set period of time has elapsed, the controller 180 may terminate the remote connection to the electronic device, or after the last message is received from the electronic device, when the pre-set period of time has elapsed, the controller 180 may terminate the remote connection to the electronic device.

In this case, since the pre-set period of time has elapsed, the wireless communication unit 110 may transmit a second message 292 indicating that the remote connection is terminated, to the electronic device. This step may be omitted.

Also, although not shown, the wireless communication unit 110 may transmit a message indicating that the remote connection will be terminated after the lapse of the pre-set period of time (e.g., "remote connection will be terminated in one minute") to the electronic device, before the pre-set time on the basis of a point in time at which the remote connection is terminated.

In the embodiments of the present invention, the foregoing method may be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet). The computer may include a controller of a terminal.

The mobile terminal according to the embodiments of the present disclosure is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a memory;
a wireless communication unit configured to receive at least one of authentication information and a message from an external electronic device;
an authenticating unit configured to perform user authentication by using the authentication information received from the electronic device; and
a controller configured to:
when the user authentication is performed, perform a control operation in response to a control command included in the received message,
after an event is generated based on the performing of the control operation, detect information regarding the generated event and information stored in the memory based on the control command;
generate a result message of the control command including the information regarding the generated event and the information stored in the memory based on the control command; and
transmit the result message to the electronic device.

2. The mobile terminal of claim 1, wherein the authenticating unit performs user authentication by using at least one of image data, audio data, and text data included in the message received from the electronic device.

3. The mobile terminal of claim 2, wherein the authenticating unit determines whether the message received from the electronic device includes pre-set first text data, and the authenticating unit determines whether to recognize the received message as a preceding message to start user authentication according to the determination results.

4. The mobile terminal of claim 3, wherein when the received message is recognized as a message preceding for user authentication, the authenticating unit determines whether to perform user authentication according to whether second text data used as a password is included in the received message.

5. The mobile terminal of claim 4, wherein when user authentication is performed, the authenticating unit transmits, to the electronic device, a message indicating that user authentication has performed, and when the user authentication fails, the authenticating unit transmits, to the electronic device, a message indicating that user authentication has failed.

6. The mobile terminal of claim 5,
wherein when user authentication fails continuously by a pre-set number of times, the authenticating unit stores, in the memory, identification information of the electronic device in order to filter a message received from the electronic device.

7. The mobile terminal of claim 1, wherein the controller extracts a control command included in a received message by using a natural language processing (NLP) algorithm.

8. The mobile terminal of claim 7, wherein the controller installs a new application or changes a user interface of a home screen based on the basis of the control command.

9. The mobile terminal of claim 1, wherein although the control command is received, the controller transmits a message including the detected information to the electronic device selectively according to a user setting.

10. The mobile terminal of claim 1, further comprising:
a body,
wherein the detected information includes at least one of location information of the body, contact number information stored in the memory, schedule information stored in the memory, message information received from a counterpart, and call history information.

11. The mobile terminal of claim 1, further comprising:
a display unit,
wherein the controller displays records of performing the control operation on the display unit, and when at least one of the records of performing the control operation displayed on the display unit is selected, the controller displays information related to the selected control operation on the display unit.

12. The mobile terminal of claim 11, wherein the controller displays notification information indicating a presence of history of performing user authentication by the electronic device on the display unit.

13. The mobile terminal of claim 12, wherein the records of performing the control operation includes a message transmission record or a message check record according to the control command received from the electronic device, and
the controller displays a message window indicating a message transmission result or a message check result according to the control command received from the electronic device such that it is discriminated from other message windows.

14. The mobile terminal of claim 1, wherein the controller determines whether pre-set third text data is included in the message received from the electronic device, and
when the third text data is included in the received message, the controller disregards a control command received from the electronic device until when user authentication is newly performed.

15. The mobile terminal of claim 1, wherein after user authentication is performed, when a pre-set period of time has lapsed, the controller disregards a control command received from the electronic device until when additional user authentication is performed.

16. A control method of a mobile terminal, the method comprising:
receiving at least one of authentication information and a message from an external electronic device;
performing user authentication by using the authentication information received from the electronic device;
after the user authentication is performed, performing a control operation in response to a control command included in the received message;
generating an event based on the performing of the control operation;
detecting information regarding the generated event and information stored in a memory based on the control command;
generating a result message of the control command including the information regarding the generated event and the information stored in the memory based on the control command; and
transmitting the result message to the electronic device.

17. The control method of claim 16, wherein the performing of user authentication by using the authentication information received from the electronic device comprises:

performing user authentication by using at least one of image data, audio data, and text data included in the message received from the electronic device.

18. The control method of claim 16, further comprising:

displaying, on a display unit, records of performing the control operation; and when at least one of the records of performing the control operation displayed on the display unit is selected, displaying information related to the selected control operation on the display unit.

19. The control method of claim 18, further comprising:

displaying, on the display unit, notification information indicating a presence of history of performing user authentication by the electronic device.

\* \* \* \* \*